US007761613B2

(12) United States Patent
Chen et al.

(10) Patent No.: US 7,761,613 B2
(45) Date of Patent: Jul. 20, 2010

(54) ELECTRICAL DEVICE CONFIGURATION SYSTEM AND METHOD

(75) Inventors: Li-Ter Chen, West Hills, CA (US);
David Hoard, Escondido, CA (US);
Rebecca Vanderhoff, Rochester, NY (US); Robert Reay, Rochester, NY (US)

(73) Assignee: Belkin International, Inc., Playa Vista, CA (US)

( * ) Notice: Subject to any disclaimer, the term of this patent is extended or adjusted under 35 U.S.C. 154(b) by 279 days.

(21) Appl. No.: 11/825,630

(22) Filed: Jul. 6, 2007

(65) Prior Publication Data

US 2009/0013094 A1   Jan. 8, 2009

(51) Int. Cl.
*G06F 3/00* (2006.01)

(52) U.S. Cl. .................. 710/10; 710/8; 710/9; 709/250; 713/1; 713/2; 717/176; 717/177; 717/178

(58) Field of Classification Search ........................ None
See application file for complete search history.

(56) References Cited

U.S. PATENT DOCUMENTS

| 5,557,748 | A | | 9/1996 | Norris | |
|---|---|---|---|---|---|
| 5,655,148 | A | | 8/1997 | Richman et al. | |
| 6,118,768 | A | * | 9/2000 | Bhatia et al. | 370/254 |
| 7,111,054 | B2 | * | 9/2006 | Lo | 709/220 |
| 7,420,934 | B2 | * | 9/2008 | Bertram et al. | 370/255 |
| 2002/0166045 | A1 | * | 11/2002 | Fleming, III | 713/1 |
| 2002/0194385 | A1 | * | 12/2002 | Linder et al. | 709/250 |
| 2003/0105839 | A1 | * | 6/2003 | Ben | 709/220 |
| 2004/0205258 | A1 | | 10/2004 | Wilson et al. | |
| 2006/0072521 | A1 | | 4/2006 | Bhatt et al. | |

OTHER PUBLICATIONS

IBM TDB, Method for Automatically Configuring Static Network Addresses in a Server Blade Environment, Oct. 27, 2001, IBM Technical Disclosure Bulletin, pp. 1-2.*
Connecting TiVo to a Home Network; http://tech.yahoo.com/gd/connecting-tivo-to-a-home-network/153116; 7 pages; Feb. 26, 2007.
TiVo Desktop & Home Media Features Guide; Connecting your TiVo® DVR to your home network; Using the TiVo Desktop application; Enjoying TiVo Home Media features; 47 pages; 2006.
Setup for Antenna or Cable (no cable box); 2 pages; 2006.
User Manual for ADSL Modem with Wireless G Router; 108 pages; 2006.

* cited by examiner

*Primary Examiner*—Eron J Sorrell
(74) *Attorney, Agent, or Firm*—Bryan Cave LLP

(57) ABSTRACT

A system (100) capable of configuring an electrical device (101) coupled to a computer (102), the system includes: (a) a computer communications component (111) of the electrical device configured to communicate with the computer; and (b) an installation component (120) of the electrical device capable of an initial configuration the electrical device. In this embodiment, the installation component is configured to automatically begin the initial configuration of the electrical device as soon as the installation component detects the electrical device is not configured and the computer communications component establishes a data connection between the electrical device and the computer. Furthermore, the initial configuration of the electrical device includes an initial configuration of either a dynamic or non-dynamic network connection between the electrical device and a network provider.

32 Claims, 19 Drawing Sheets

| Connection Type | Electric Device Type (Modem Router or Router) | Used Information |
|---|---|---|
| Dynamic | Modem Router | VCI, VPI, Encapsulation |
| Dynamic | Router | None |
| Static | Modem Router | VCI, VPI, Encapsulation |
| Static | Router | None |
| PPPoE or PPPoA | Modem Router | VCI, VPI, Encapsulation |
| PPPoE | Router | None |
| PPTP | Router | Client IP Address, Client Subnet Mask, Login Server |

Internet account info

Please enter the following information:

VCI

VPI

Encapsulated:  ○ vcmux   ○ llc

Cancel          Back | Next — 933

Internet account info - Connection Type

Please enter the following information:

Connection Type:

○ Dynamic IP
○ PPPoE
○ PPPoA
○ Static IP

If you are unsure of your connection type, please contact your network provider.

Cancel          Back | Next

Internet account info - Static

Please enter the following information:

| | | | | |
|---|---|---|---|---|
| IP Address | ☐ | . ☐ | . ☐ | . ☐ |
| Subnet Mask | ☐ | . ☐ | . ☐ | . ☐ |
| Gateway | ☐ | . ☐ | . ☐ | . ☐ |
| DNS Address | ☐ | . ☐ | . ☐ | . ☐ |
| DNS Address (Optional) | ☐ | . ☐ | . ☐ | . ☐ |

Cancel   Back   Next

Internet account info - PPPoE or PPPoA

Please enter the following information:

User Name

[ ]

*Example: username@domain.com*

Password

[ ]   ☐ View Password

Service Name (if given by network provider)          Connect on Demand  ☐

[ ]                                                   Timeout (0-99 minutes) [ ]

MTU (550-1500)

[ ]

Cancel   Back   Next

Internet account info - PPTP

User Name

[            ]

*Example: username@domain.com*

Password

[            ]   ☐ View Password

Connect on Demand ☐   Timeout (0-99 minutes) [   ]

| | | | | |
|---|---|---|---|---|
| Login Server | [   ] . | [   ] . | [   ] . | [   ] |
| Client IP Address | [   ] . | [   ] . | [   ] . | [   ] |
| Client Subnet Mask | [   ] . | [   ] . | [   ] . | [   ] |
| DNS Address | [   ] . | [   ] . | [   ] . | [   ] |
| Secondary Address (Optional) | [   ] . | [   ] . | [   ] . | [   ] |

( Cancel )                    ( Back | Next )

Username & Password

Please enter the following information:

User Name

[            ]

*Example: username@domain.com*

Password

[            ]

☐ View Password ( Cancel )                    ( Back | Next )

Internet account information not accepted

Your network provider did not accept the settings shown below when we tried to connect. Please examine them closely to see if anything is incorrect.

| Network Settings | | Network Settings | |
|---|---|---|---|
| IP Address | XXX XXX XXX XXX | VCI | vci-val |
| Subnet Mask | XXX XXX XXX XXX | VPI | vpi-val |
| Primary DNS Server | XXX XXX XXX XXX | | |
| Secondary DNS Server | XXX XXX XXX XXX | Encapsulation | |
| Gateway Address | XXX XXX XXX XXX | llc/vcmux | |

Are the settings listed above correct?    Yes ⦿    No/Not Sure ○

[ Cancel ]    [ Back | Next ]

Internet account information not accepted

Your network provider did not accept the settings shown below when we tried to connect. Please examine them closely to see if anything is incorrect.

| Account Settings | | Modem Settings | |
|---|---|---|---|
| User Name: | Mary.Smith@domain.com | VCI: | vci-val |
| Password: | XXXXXXXX | VPI: | vpi-val |
| View Password | ☐ | Encapsulation: | llc/vcmux |

Service Name:    SName
MTU:    mtu-val

Connect on Demand
yes/no        Time-out:  5 min.

Are the settings listed above correct?    Yes ⦿    No/Not Sure ○

[ Cancel ]    [ Back | Next ]

Internet account information not accepted

Your network provider did not accept the settings shown below when we tried to connect. Please examine them closely to see if anything is incorrect.

| Network Settings | | Account Settings |
|---|---|---|
| Login Server | XXX.XXX.XXX.XXX | User Name |
| Client IP | XXX.XXX.XXX.XXX | John.Smith@domain.com |
| Subnet Mask | XXX.XXX.XXX.XXX | Password |
| Primary DNS Server | XXX.XXX.XXX.XXX | ******** |
| Secondary DNS Server | XXX.XXX.XXX.XXX | View Password ☐ |

1800

Connect on Demand: yes/no      Time-out: 5 min.

Are the settings listed above correct?     Yes ⦿   No/Not Sure ○

( Cancel )      ( Back | Next )

FIG. 18

ELECTRICAL DEVICE CONFIGURATION SYSTEM AND METHOD

FIELD OF THE INVENTION

This invention relates generally to electrical devices, and relates more particularly to systems and methods for initially configuring an electrical device electrically coupled to a computer.

DESCRIPTION OF THE BACKGROUND

When electrically coupling an electrical device to a computer, many electrical devices require the execution of an installation program to configure the electrical device to function properly. The conventional method of configuring an electrical device electrically coupled to a computer requires a CD-ROM (Compact Disc Read Only Memory), a floppy disc, or another media containing the installation software. In this method, a user inserts the media into the computer and the computer executes an installation program that is stored in the media.

However, including a CD-ROM or other media containing the installation software with the electrical device increases the manufacturing cost of the electrical device. Furthermore, requiring the user to insert the media into the computer and run the installation program adds extra steps to the installation process. These extra steps increase the likelihood that some computer problem, unrelated to the electrical device, can interfere with the installation process. For example, if a CD-ROM drive is not functioning, the electrical device cannot be configured if the media containing the installation software is a CD-ROM.

Accordingly, a need or potential for benefit exists for an electrical device that can be configured to operate with a computer without requiring external media containing the installation software. Other needs or potentials for benefit may be apparent to a person of skill in the art.

BRIEF DESCRIPTION OF THE DRAWINGS

The invention will be better understood from a reading of the following detailed description of examples of embodiments, taken in conjunction with the accompanying figures in the drawings in which:

FIG. 9 illustrates an example of a web page used to collect information about the electrical device of FIG. 1, according to an embodiment;

FIG. 10 illustrates an example of a web page used to collect information about the network connection type used by the network provider of FIG. 1, according to an embodiment;

FIG. 11 illustrates an example of a web page used to collect information for a static network connection, according to an embodiment;

FIG. 12 illustrates an example of a web page used to collect information for a Point-to-Point Protocol over Ethernet or a Point-to-Point Protocol over Asynchronous Transfer Mode network connection, according to an embodiment;

FIG. 13 illustrates an example of a web page used to collect information for a Point-to-Point Tunneling Protocol network connection, according to an embodiment;

FIG. 14 illustrates an example of a web page used to collect user information, according to an embodiment;

FIG. 16 illustrates an example of a web page used to confirm the network connection configuration information for a static network connection, according to an embodiment;

FIG. 17 illustrates an example of a web page used to confirm the network connection configuration information for a Point-to-Point Protocol over Ethernet or a Point-to-Point Protocol over Asynchronous Transfer Mode network connection, according to an embodiment;

FIG. 18 illustrates an example of a web page used to confirm the network connection configuration information for a Point-to-Point Tunneling Protocol network connection, according to an embodiment;

Figure 1:
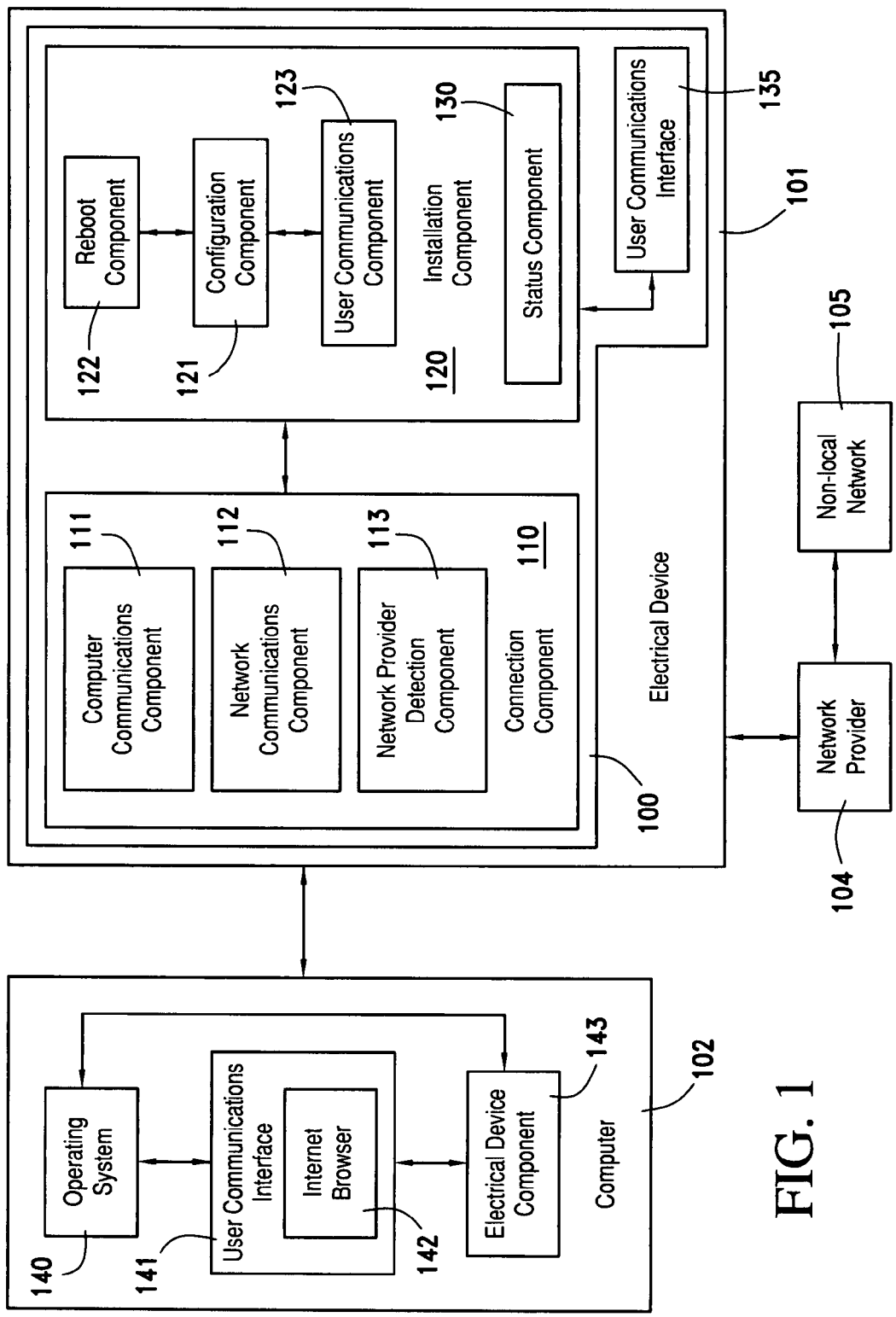
FIG. 1 is a block diagram of an example of a system configured to initially configure an electrical device coupled to a computer, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, physically, mechanical, or other manner. "System," as used herein, can refer to, or otherwise include, one computer application or two or more computer applications.

DETAILED DESCRIPTION OF EXAMPLES OF EMBODIMENTS

In one embodiment, a system capable of configuring an electrical device coupled to a computer includes: (a) a computer communications component of the electrical device configured to communicate with the computer; and (b) an installation component of the electrical device capable of an initial configuration of the electrical device. In this embodiment, the installation component is configured to automatically begin the initial configuration of the electrical device as soon as the installation component detects the electrical device is not configured and the computer communications component establishes a data connection between the electrical device and the computer. Furthermore, the initial configuration of the electrical device includes an initial configuration of either a dynamic or non-dynamic network connection between the electrical device and a network provider.

In another embodiment, a system for configuring a network connection from a computer to a network provider includes: (a) a status component in a network device capable of determining if the network device is configured to provide the network connection from the computer to the network provider; and (b) a configuration component in the network device capable of initially configuring the network device to provide the network connection from the computer to the network provider. In this embodiment, the configuration component is configured to automatically begin initially configuring the network device to provide the network connection as soon as the status component determines the network device is not configured to provide the network connection from the computer to the network provider. Additionally, the configuration component is capable of initially configuring both a dynamic network connection and a non-dynamic network connection.

In yet another embodiment, a system in an electrical device for configuring a network connection from the electrical device to a network provider includes: (a) a status component capable of determining whether the electrical device has been initially configured; and (b) a configuration component in the electrical device capable of initially configuring the electrical device to provide the network connection from the electrical device to the network provider. In this embodiment, the configuration component is configured to automatically initially configure the electrical device without the electrical device being coupled to the computer when the network connection is a dynamic network connection and the status component detects the electrical device is not configured. Moreover, when the network connection is a non-dynamic network connection, the configuration component is configured to automatically begin initially configuring the electrical device as soon as the status component detects the electrical device is not configured.

In a still further embodiment, a method of configuring an electrical device includes: (a) coupling the electrical device to a computer; (b) coupling the electrical device to a network provider; (c) establishing a data connection between the computer and the electrical device; and (d) after establishing the data connection, initially configuring the electrical device. In this embodiment, initially configuring the electrical device includes automatically executing software in the electrical device capable of initially configuring both a dynamic network connection and a non-dynamic network connection between the electrical device and the network provider.

In an additional embodiment, a method of configuring a network device includes: (a) coupling the network device to a network provider; (b) attempting to initially configure a dynamic network connection between the network device and the network provider by automatically executing software in the network device if the network device is not configured; and (c) if the network device is not configured and the dynamic network connection was not configured, initially configuring a non-dynamic network by automatically executing the software in the network device. In this embodiment, the initial configuring of the non-dynamic network includes (a) beginning initial configuration of the non-dynamic network; (b) receiving installation information from a user; and (c) finishing the initial configuration of the non-dynamic network using the installation information received from the user.

Turning to the figures, FIG. 1 is a block diagram of an example of a system 100 capable of initially configuring an electrical device 101 coupled to a computer 102. System 100 can also be considered a system for initially configuring a network connection from electrical device 101 or computer 102 to a network provider 104 or a non-local network 105. System 100 is merely exemplary and the invention is not limited to the specific embodiments or examples presented herein. System 100 can be employed in many different embodiments or examples not specifically depicted or described herein.

As an example, system 100 can include: (a) a connection component 110 of electrical device 101 configured to facilitate communications between electrical device 101 and computer 102 and between electrical device 101 and network provider 104; and (b) an installation component 120 of electrical device 101 configured to initially configure electrical device 101. In some embodiments, electrical device 101 can also include a user communications interface 135 that can be used to communicate directly with the user. In some examples, user communications interface 135 can be a touch screen or a video screen and an input device, for example.

In some embodiments, installation component 120 is configured to automatically begin the initial configuration of the electrical device as soon as installation component 120 detects that electrical device 101 is not configured and connection component 110 establishes a data connection between electrical device 101 and computer 102. In other embodiments, installation component 120 is configured to automatically begin initially configuring electrical device 101 to provide the network connection as soon as connection component 110 determines that electrical device 101 is not configured to provide the network connection from computer 102 to network provider 104.

In some embodiments, beginning the initial configuration of the electrical device "as soon as" includes waiting a period of time before beginning configuration. Furthermore, to begin the initial configuration of electrical device 101 means starting to perform the methods, activities, processes, and/or procedures needed to configure electrical device 101.

In one embodiment, electrical device 101 is a gateway device. A gateway device is an electrical device used to couple a computer to a network or other electrical devices on a network. For example, electrical device 101 can be a modem, a router, a modem-router, a VoIP (voice over internet protocol) modem-router, a wireless Ethernet bridge, or a client network adapter. In other embodiments, electrical device 101 can be a network storage device, a digital media receiver, a network printer, or IP (internet protocol) camera.

Network provider 104 can be a business, organization, computer, server, router, or the like that allows electrical device 101, computer 102, or a group of computers to connect to non-local network 105 (e.g., the Internet). For example, an internet service provider (ISP) can be a network provider.

In some embodiments, the initial configuration of electrical device 101 (i.e., initially configuring electrical device 101) includes setting-up electrical device 101 such that electrical device 101 can function properly. In some embodiments, the initial configuration of electrical device 101 can also include installing software components on computer 102. In the same or different embodiments, initially configuring electrical device 101 includes setting-up electrical device 101 such that electrical device 101 functions properly and can communicate with computer 102. In yet another embodiment, initially configuring electrical device 101 includes setting-up electrical device 101 such that electrical device 101 functions properly and can communicate with computer 102 and access non-local network 105. In one example, non-local network 105 can be accessed through network provider 104. In the same or a different embodiment, setting-up electrical device 101 to communicate with computer 102 means setting-up electrical device 101 to communicate with computer 102 through one or more other electrical devices.

Setting-up electrical device 101 can include the methods, procedures, processes and/or activities described below or any other methods, procedures, process and/or activities consistent with the description or spirit of system 100.

In one example, connection component 110 can include: (a) a computer communications component 111 configured to communicate with computer 102; (b) a network communications component 112 configured to communicate with network provider 104 and non-local network 105; and (c) a network provider detection component 113 configured to detect a network connection between electrical device 101 and network provider 104.

In the same or a different embodiment, installation component 120 can include: (a) a configuration component 121 configured to initially configure electrical device 101; (b) a reboot component 122 configured to reboot electrical device 101 or a portion of electrical device 101; (c) a user communications component 123 configured to receive information from a user and communicating the information to configuration component 121; and (d) a status component 130.

In one example, status component 130 is configured to determine the configuration status of electrical device 101. That is, status component 130 determines whether electrical device 101 is configured. Additionally, in some examples, status component 130 is configured to determine the status of the network connection. That is, status component 130 can determine whether electrical device 101 is configured to provide the network connection from computer 102 or electrical device 101 to network provider 104. In some embodiments, network provider detection component 113 detects the status of the network connection between computer 102 or electrical device 101 and network provider 104 and communicates the network status to status component 130.

In one embodiment, the status of electrical device 101 and the network configuration can be communicated by status component 130 to configuration component 121. In this example, if status component 130 determines electrical device 101 is not configured, configuration component 121 configures electrical device 101.

In various examples, computer 102 can include (a) an operating system 140; (b) a user communications interface 141 configured to communicate with the user of computer 102. In one example, user communications interface 141 includes an internet browser 142. In the same or a different example, computer 102 can also include an electrical device component 143 after the initial configuration of electrical device 101.

Figure 2:
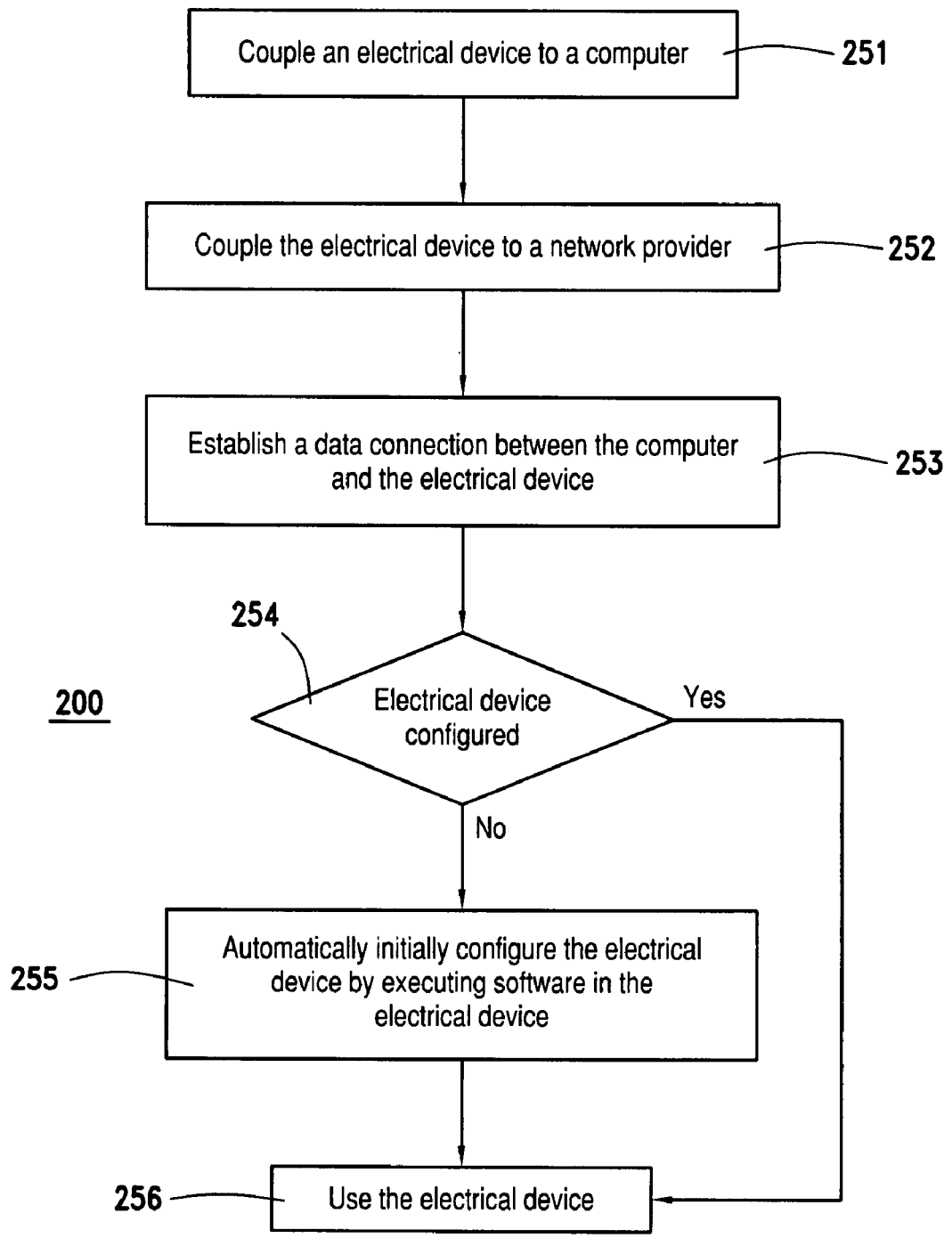
FIG. 2 illustrates a flow chart for an example of a method of configuring the electrical device of FIG. 1, according to the first embodiment.

FIG. 2 illustrates a flow chart for an example of a method 200 of configuring electrical device 101 (FIG. 1), according to the first embodiment. It should be appreciated that this method is merely illustrative of a technique for implementing the various aspects of certain embodiments described herein, and that system 100 (FIG. 1) and method 200 are not limited to this particular embodiment, as numerous other embodiments are possible.

In this illustrated example, a first activity in method 200 is an activity 251 of coupling electrical device 101 (FIG. 1) to computer 102 (FIG. 1). Referring again to FIG. 1, electrical device 101 can be coupled to computer 102 using a cable (not shown) in several embodiments. For example, a first connector of an Ethernet cable can be coupled to a network port (not shown) in electrical device 101. A second connector of the Ethernet cable can be coupled to a network port (not shown) in computer 102. In one embodiment, the Ethernet cable is a Category 5 (Cat 5) cable and the first and second connectors are RJ45 (registered jack) connectors. In another example, electrical device 101 is coupled to computer 102 using a wireless network connection. In further examples, electrical device 101 can be coupled to computer 102 indirectly through one or more other electrical devices.

Referring again to FIG. 2, the next activity in method 200 is an activity 252 of coupling electrical device 101 (FIG. 1) to network provider 104 (FIG. 1). In some embodiments, electrical device 101 (FIG. 1) is directly coupled to network provider (FIG. 1). Coupling electrical device 101 (FIG. 1) to network provider 104 (FIG. 1) can refer to, or otherwise include, directly or indirectly coupling electrical device 101 (FIG. 1) to network provider 104 (FIG. 1) and/or coupling electrical device 101 (FIG. 1) to network provider 104 (FIG. 1) through a telephone network, cable network, satellite network, or the like.

As shown in FIG. 1, electrical device 101 can be coupled directly to network provider 104. In one example, electrical device 101 is coupled to network provider 104 by coupling a first connector of a cable (not shown) to electrical device 101 and a second connector of the cable to a telephone jack (not shown) or cable or a satellite wall outlet (not shown) as examples.

Figure 3:
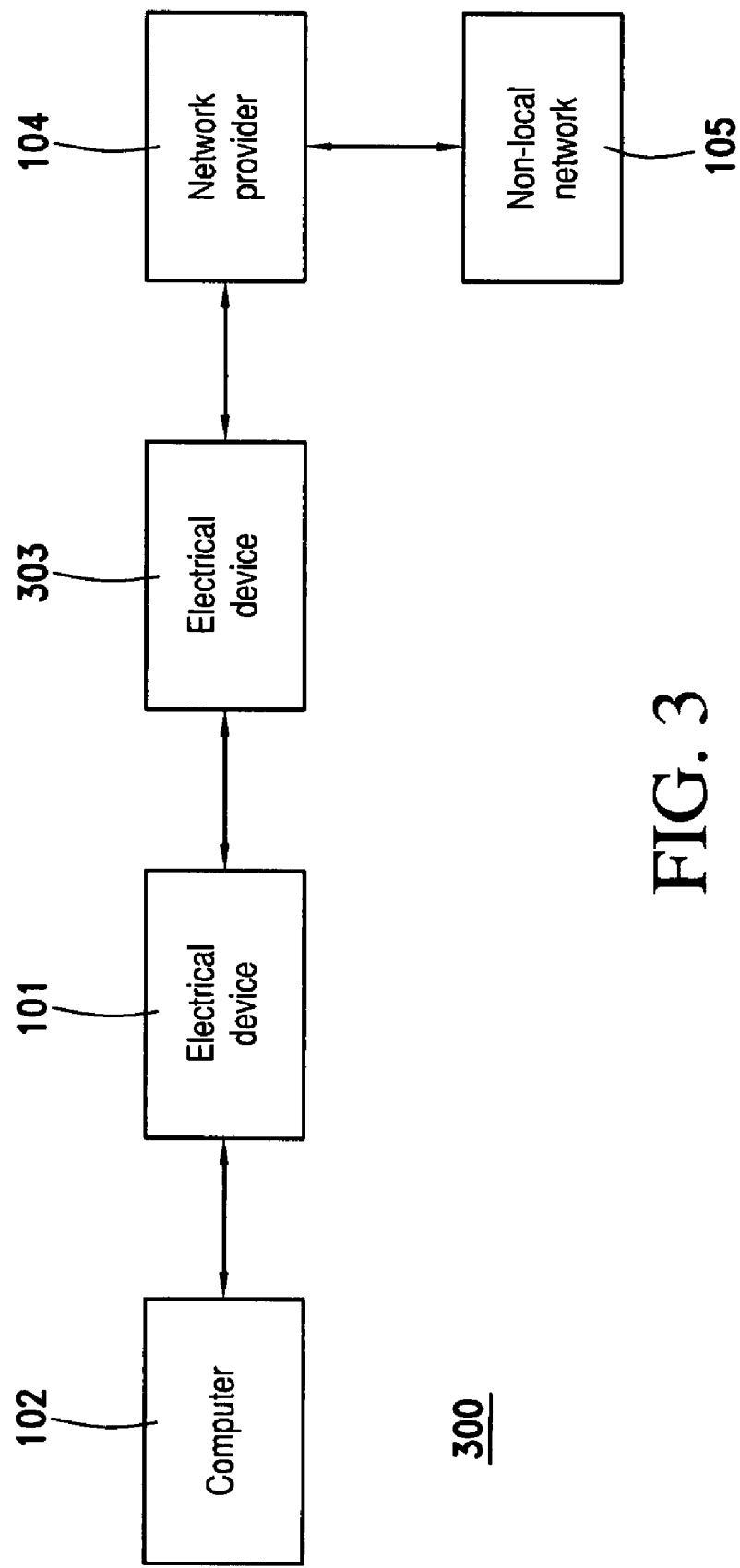
FIG. 3 illustrates a block diagram of an example of an alternative network configuration, according to one embodiment.

In another example, electrical device 101 is coupled to network provider 104 indirectly through other electrical devices. FIG. 3 illustrates an example of a block diagram of an alternative network configuration 300, according to one embodiment. In this example, electrical device 101 is coupled to an electrical device 303 and computer 102. Electrical device 303 is coupled to network provider 104, which is coupled to non-local network 105. In one example, electrical device 303 is a modem. In another embodiment, electrical device 303 is a network adapter. In the same or a different example, electrical device 303 is coupled to network provider 104 through a telephone network, a satellite network, or a cable network.

In some embodiments, activity 252 can be omitted. For example, when electrical device 101 is not a gateway device activity 252 is not needed and can be skipped.

Referring back to FIG. 2, the next activity in method 200 is an activity 253 of establishing a data connection between computer 102 (FIG. 1) and electrical device 101 (FIG. 1). Referring again to FIG. 1, the data connection between electrical device 101 and computer 102 is established when electrical device 101 and computer 102 are turned on and coupled together. In other embodiments, the data connection is established when electrical device 101 and computer 102 complete a handshaking or other communication establishing routine.

In yet another embodiment, the data connection is established when electrical device 101 receives a message, request, and/or data from computer 102 or computer 102 receives a message, request, and/or data from electrical device 101. For example, a user can launch internet browser 142 in computer 102. After being launched, internet browser 142 can attempt to open a web page in non-local network 105. To access non-local network 105, internet browser 142 sends data to electrical device 101. In some embodiments, the receiving of the data by electrical device 101 establishes the data connection.

Again referencing FIG. 2, the next activity in method 200 is an activity 254 of determining whether electrical device 101 (FIG. 1) is initially configured. Referring to FIG. 1, status component 130 is capable of determining whether the electrical device is configured. If status component 130 determines electrical device 101 is not configured, system 100 initially configures electrical device 101 in an activity 255. If electrical device 101 is configured, the next activity in method 200 is an activity 256 of using electrical device 101.

In one example, status component 130 determines if electrical device 101 is configured by checking a value of an initial configuration status variable stored in electrical device 101. In one embodiment, the initial configuration status variable is stored in memory (not shown) of electrical device 101. In this embodiment, the initial configuration variable is set to a predetermined value during the manufacturing process. Installation component 120 sets the initial configuration status variable to a different value after initially configuring electrical device 101. If the initial configuration status variable is set to the manufacturing process predetermined value, status component 130 concludes that electrical device 101 is not configured. Otherwise, status component 130 concludes that electrical device 101 is configured.

In another example, status component 130 determines if electrical device 101 is configured by determining if the settings of electrical device 101 are the default settings. The default settings are the settings of electrical device 101 set during the manufacturing of electrical device 101. If the settings of electrical device 101 are the default settings, status component 130 concludes that electrical device 101 is not configured.

In some examples, system 100 can also automatically reconfigure electrical device 101 after a reset or restoring of the default settings. For example, if there is a problem with electrical device 101 and the user restores the default settings or resets electrical device 101, system 100 will automatically begin the initial configuration process again when electrical device 101 is restarted. In one embodiment, the user can restore the default setting or reset electrical device 101 by pressing a reset button (not shown) in electrical device 101.

Referring back to FIG. 2, if electrical device 101 is not configured, the next activity in method 200 is activity 255 of automatically initially configuring electrical device 101 (FIG. 1) by executing software in electrical device 101 (FIG. 1). Referring to FIG. 1, in some embodiments, activity 255 (FIG. 2) includes initially configuring the network connection between electrical device 101 and network provider 104.

Configuring the network connection includes configuring either a dynamic or non-dynamic network connection. Automatically initially configuring electrical device refers to beginning the initial configuration process without any user intervention. That is, when a certain set of conditions are met, system 100 can begin the initial configuration process without waiting for any instructions or intervention from the user of computer 102. In some embodiments, the beginning of the initial configuration as soon as some conditions are met includes waiting a period of time before beginning the initial configuration of electrical device 101.

In some embodiments, the initial configuring of electrical device 101 automatically begins if electrical device 101 is not configured. In other embodiments, the initial configuring of electrical device 101 automatically begins if electrical device 101 is not configured and a data connection between electrical device 101 and computer 102 has been established. In other embodiments, the initial configuration can automatically begin when electrical device 101 is coupled to network provider 104.

The initial configuration of electrical device 101 includes the initial set-up of electrical device 101 and any further reconfigurations of electrical device 101 after electrical device 101 is reset to the default settings or any other erasure or resetting of the setting of electrical device 101.

The initial configuration of electrical device 101 does not include changing or reconfiguring of settings, variables, and/or data needed to keep electrical device 101 properly functioning after initial configuration, unless the device is reset. For example, the initial configuration does not include renewing, requesting, releasing, or changing an IP (Internet Protocol) address after an initial IP address has been assigned and a network connection is established. In another example, the initial configuration does not include changing a password when the password has expired. In a further example, the initial configuration does not include reconfiguring electrical device 101 after changing network providers or the configuration of the local network.

Figure 4:
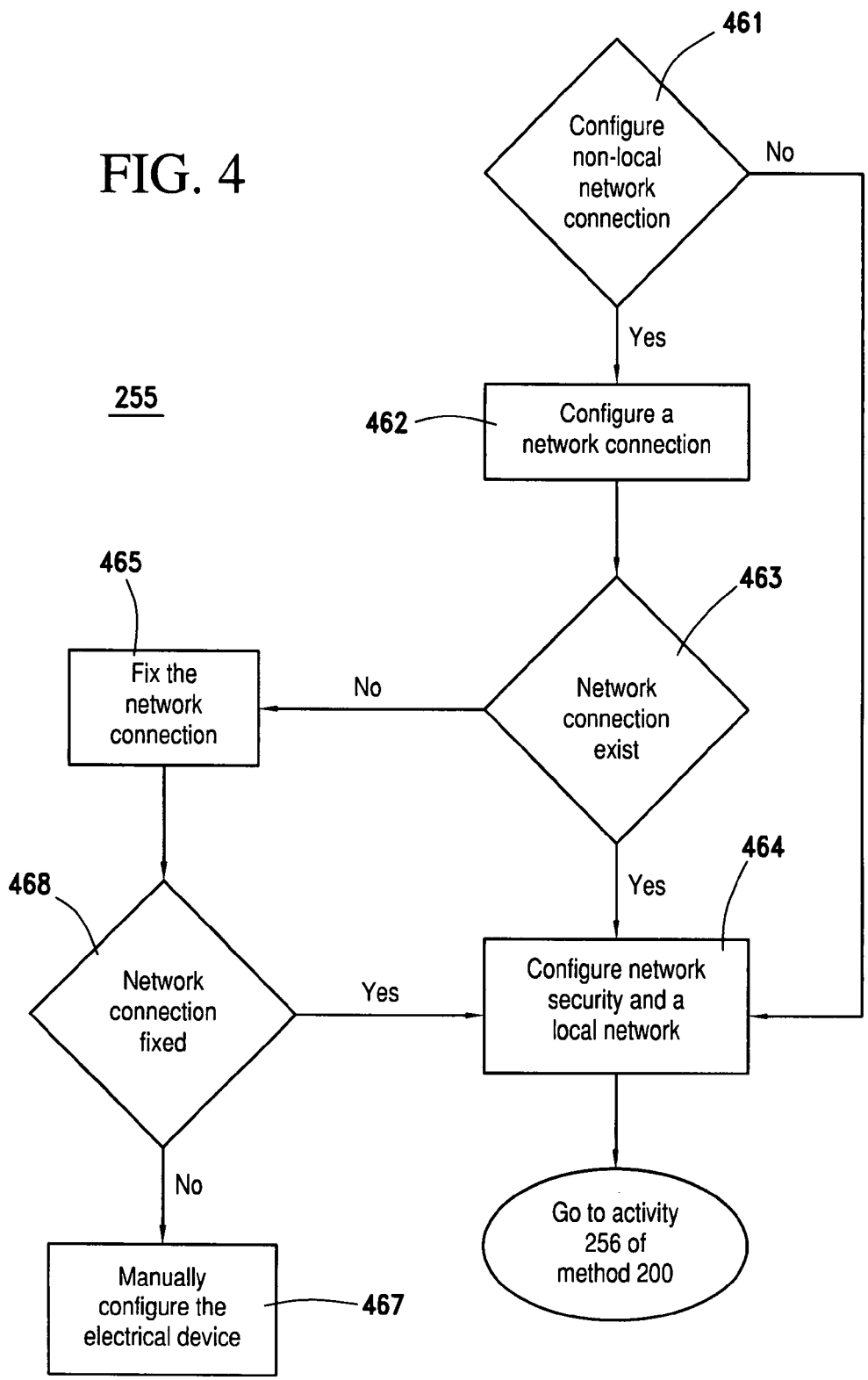
FIG. 4 illustrates a flow chart describing a an example of method of initially configuring the electrical device of FIG. 1 by executing software in the electrical device of FIG. 1, according to the first embodiment.

FIG. 4 illustrates a flow chart describing an example of activity 255, of initially configuring electrical device 101 (FIG. 1) by executing software in electrical device 101 (FIG. 1) according to the first embodiment. The first process in activity 255 is a process 461 of determining whether to configure non-local network connection.

Referring yet again to FIG. 1, in one embodiment, installation component 120 can determine whether the user only wants to configure the non-local network connection. In one example, user communications component 123 can query the user of computer 102. For example, user communications component 123 can instruct computer 102 to display a web page in internet browser 142. This web page allows a user to indicate if the user wants to configure a non-local network connection. In other embodiment, electrical device 101 can use user communications interface 135 to query the user.

In some embodiments, process 461 (FIG. 4) can be omitted. In these embodiments, installation component 120 assumes the user wants to configure a network connection to non-local network 105 and does not query the user. For example, if electrical device 101 is a modem and/or a router, system 100 can assume a user wants to configure a network connection and process 461 (FIG. 4) can be omitted.

In some non-illustrated embodiments, before or after process 461 (FIG. 4), installation component 120 can ask the user which country the user is in. If the user selects a country where there are known problems with configuring electrical device 101, or if electrical device 101 does not have any information regarding configuring a network connection in that country, installation component 120 can instruct the user to use alternative installation methods. For example, installation component 120 can instruct the user to manually configure electrical device 101 or use an installation program in a CD-ROM.

Referring again to FIG. 4, if the user does not want to configure a non-local network connection, the next process in activity 255 is a process 464 of configuring network security and a local network. If the user wants to configure a non-local network connection, the next process is a process 462 of establishing a network connection.

Figure 5:
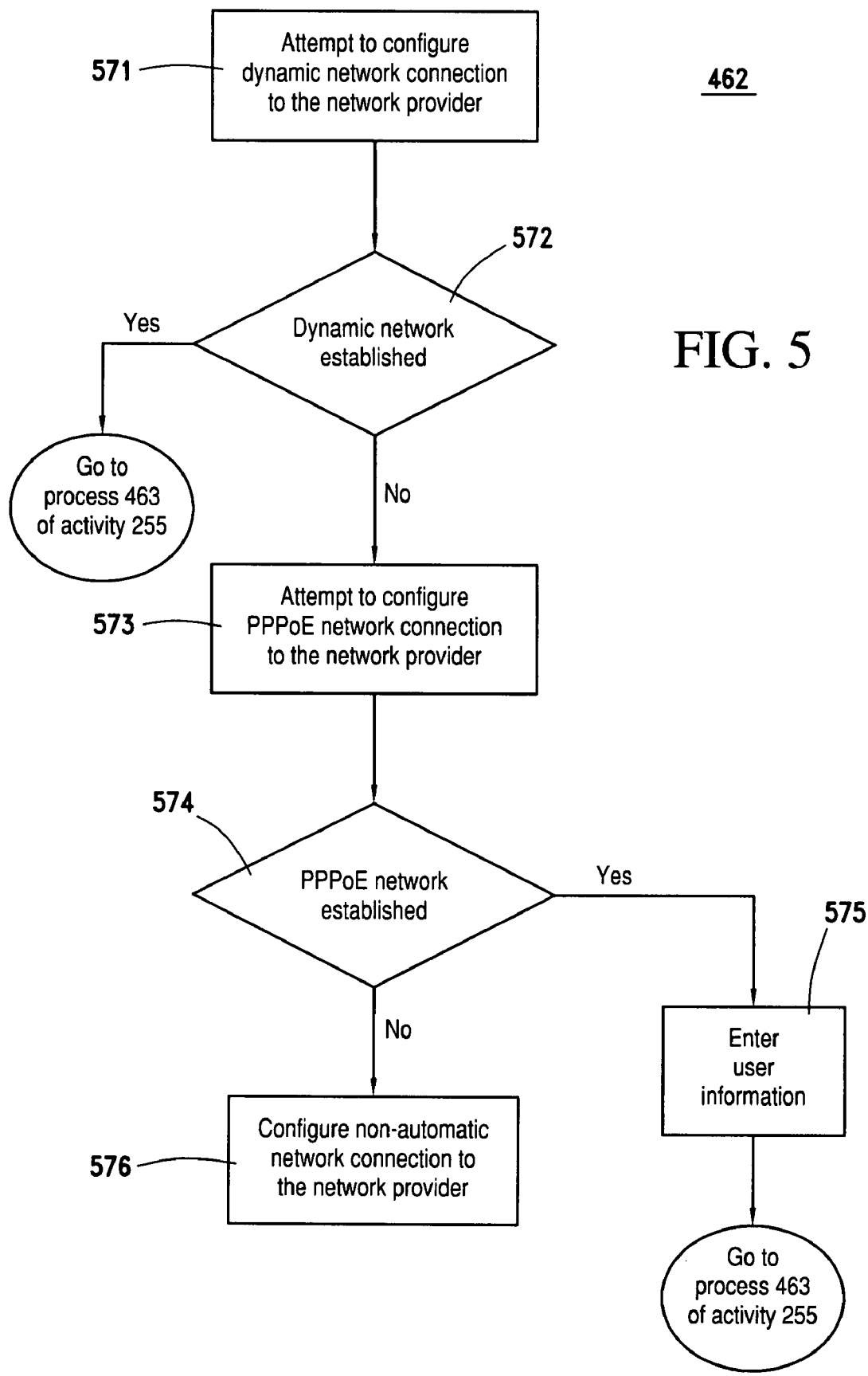
FIG. 5 illustrates a flow chart describing an example of a process of establishing a network connection, according to the first embodiment.

FIG. 5 illustrates a flow chart describing an example of process 462 of establishing a network connection, according to the first embodiment. Many different protocols or network connection types exist for facilitating communication between two electrical devices in a network. The flow chart of FIG. 5 illustrates one method of connecting electrical device 101 (FIG. 1) to network provider 104 (FIG. 1) using a dynamic network protocol, PPPoE (Point-to-Point Protocol over Ethernet), or a non-automatic network type. One skilled in the art would recognize that this invention is not limited to networks using these types of network protocols and the initial configuration process can vary between different network protocols. The examples described below are merely illustrative of a technique for implementing one aspect of one embodiment. The initial configuration of electrical device 101 (FIG. 1) is not limited to these particular embodiments, network connection types or protocols, as numerous other protocols and types of network connections are possible and within the scope of this invention. For example, network connections can also be established using PPPoA (Point-to-Point Protocol over Asynchronous Transfer Mode) or PPTP (Point-to-Point Tunneling) protocols.

The first procedure in process 462 is a procedure 571 of attempting to configure a dynamic network connection to network provider 104 (FIG. 1). Referring back to FIG. 1, network provider detection component 113 is configured to detect a network connection between electrical device 101 and network provider 104.

In some embodiments, network provider detection component 113 can detect a dynamic network connection without previously configuring the network connection. A dynamic network connection is a network connection where the network provider automatically assigns IP addresses, subnet masks, a default gateway, and/or other IP parameters to electrical devices in the network. For some dynamic network connections, no user interaction is necessary to configure the network connection.

In one example, network provider detection component 113 sends out a query requesting assignment of IP parameters from network provider 104. If network provider 104 is configured to provide a dynamic network, network provider 104 replies to electrical device 101 with its assigned IP address, subnet mask, DNS (domain name service) server, default gateway information, etc. In one embodiment, the dynamic network is established if network provider 104 responds to the request of a network provider detection component with an assignment of IP parameters.

For example, network provider 104 could use the Dynamic Host Configuration Protocol (DHCP). DHCP automates the assignment of IP addresses, subnet masks, default gateway, and other IP parameters. When electrical device 101 is DHCP compliant and network provider 104 is using DHCP, the assignment of IP parameters occurs when electrical device 101 requests assignment from network provider 104.

Referring back to FIG. 5, the next procedure in process 462 is a procedure 572 of determining whether a dynamic network was established. In one example, a dynamic network is established if connection component 110 receives a response from network provider 104 and is assigned IP parameters in a predetermined time period. If the dynamic network was established, process 462 is complete and the next process in activity 255 is a process 463 of testing the network connection.

If the dynamic network was not established, the next procedure in process 462 is a procedure 573 of attempting to configure a PPPoE network connection to network provider 104 (FIG. 1). PPPoE is a network protocol that requires user authentication when the user wants to connect to network provider 104.

Referring again to FIG. 1, in some embodiments, network provider detection component 113 attempts to establish a PPPoE network connection by using a discovery process. For example, network provider detection component 113 can attempt to determine the Ethernet MAC (Media Access Control) address of a server (not shown) of network provider 104 in order to establish a session. In one embodiment, network provider detection component 113 sends out a PADI (PPPoE Active Discovery Initiation) packet via an Ethernet broadcast (MAC address: ff:ff:ff:ff:ff:ff). This PADI packet contains the MAC address of electrical device 101. In some examples, the MAC address of electrical device 101 is the MAC address of a network adapter in computer 102.

In this embodiment, if network provider 104 is running a PPPoE network, network provider 104 replies with a PADO (PPPoE Active Discovery Offer) packet to the MAC address supplied in the PADI. The PADO packet contains the MAC address of a server (not shown) of network provider 104, its name, and the name of the service.

In this example, network provider detection component 113 then sends a PADS (PPPoE Active Discovery Session-confirmation) message to the server of network provider 104 and the server responds with a Session ID.

The next procedure in process 462, in this embodiment, is a procedure 574 of determining whether a PPPoE network connection was established. In one example, if system 100 (FIG. 1) receives a PADS message from network provider 104 (FIG. 1), a PPPoE network connection is established.

If the PPPoE network connection is established, the next procedure in process 462, in this embodiment, is a procedure 575 of entering user information. In one embodiment, the user enters a username and password to log into the PPPoE network into a web page in internet browser 142. Network communications component 112 (FIG. 1) can then send the user information to network provider 104 (FIG. 1). After the user enters the user information, process 462 is complete and the next process of activity 255 is process 463 of testing the network connection.

Figure 6:
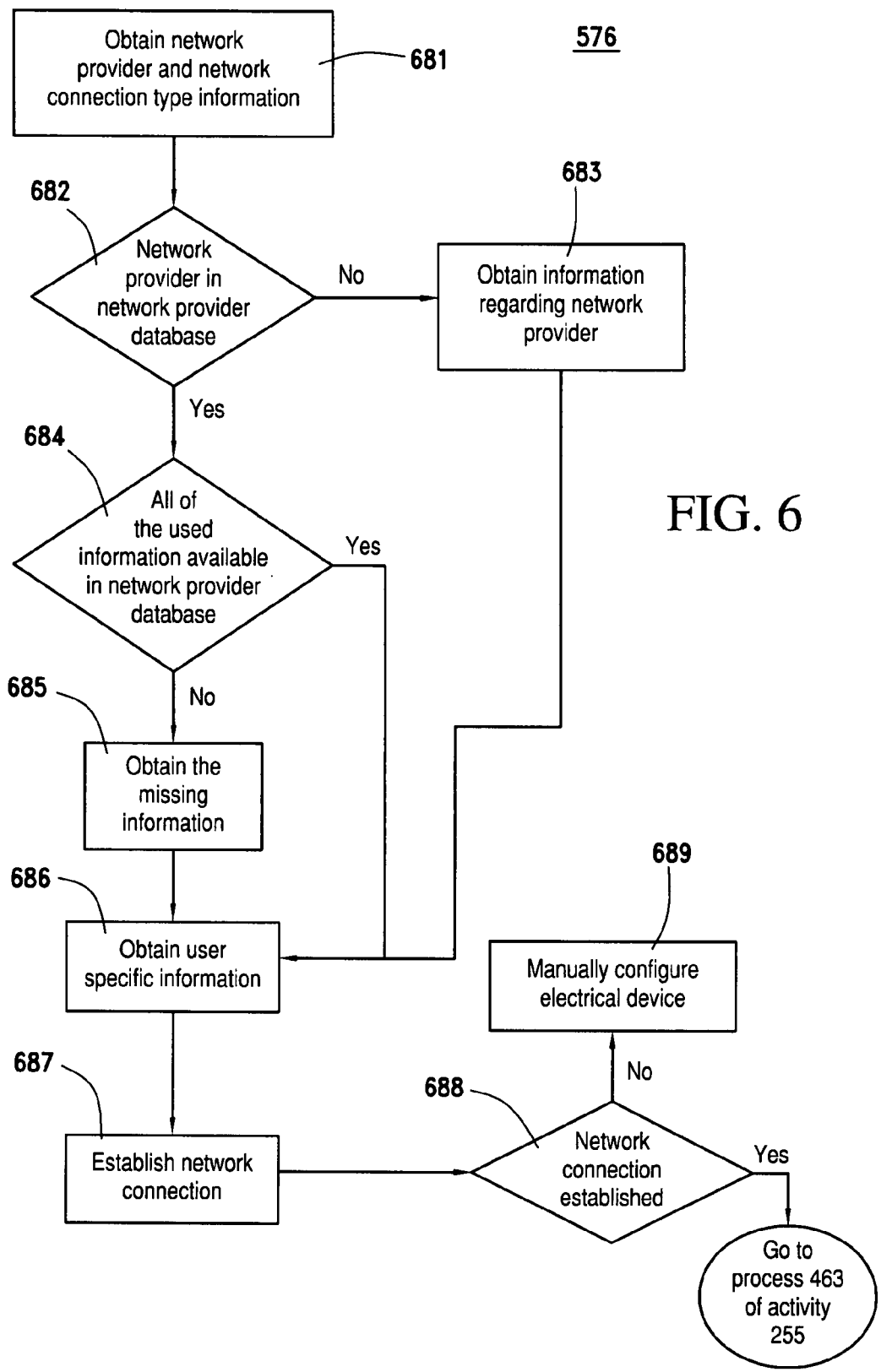
FIG. 6 illustrates a flow chart describing an example of a procedure of configuring a non-automatic network connection, according to the first embodiment.

If the PPPoE network connection was not established, the next procedure in process 462 is a procedure 576 of configuring a non-automatic network connection. FIG. 6 illustrates a flow chart describing an example of procedure 576 of configuring the non-automatic network connection to network provider 104 (FIG. 1), according to the first embodiment. The first activity in procedure 576 is an activity 681 of obtaining network provider and network connection type information. In activity 681, the user can be asked to provide some or all of the information about network provider 104.

Referring again to FIG. 1, in one example, electrical device 101 has information stored about various network providers in a network provider database (not shown) in memory (not shown). For example, electrical device 101 could store the following information about a network provider: (a) the country network provider 104 operates in; (b) the name of the network provider; (c) the network connection type used by the network provider; (d) the VPI (virtual path identifier); (e) the VCI (virtual channel identifier); (f) the encapsulation type (VCMUX (virtual circuit multiplexing) or LLC (logical link control)); (g) an IP address of the network provider; (h) a subnet mask; (i) a gateway; (j) an IP address of the primary DNS server; (k) an IP address of the secondary DNS server; (l) a service IP address; (m) the service name; (n) if the network connection is on demand (yes/no); (o) the maximum idle time; and (p) the MTU (maximum transmission unit).

In one embodiment, in activity 681, computer communications component 111 instructs computer 102 to display one or more web pages in internet browser 142 where the user can enter the information about network provider 104. In this example, the user provides some information about network provider 104 and electrical device 101 retrieves more information about network provider 104 from the network provider database. For example, computer communications component 111 can provide the information from the user to configuration component 121, which uses the user-provided information to retrieve the rest of the information from the network provider database.

Figures 7, 8:
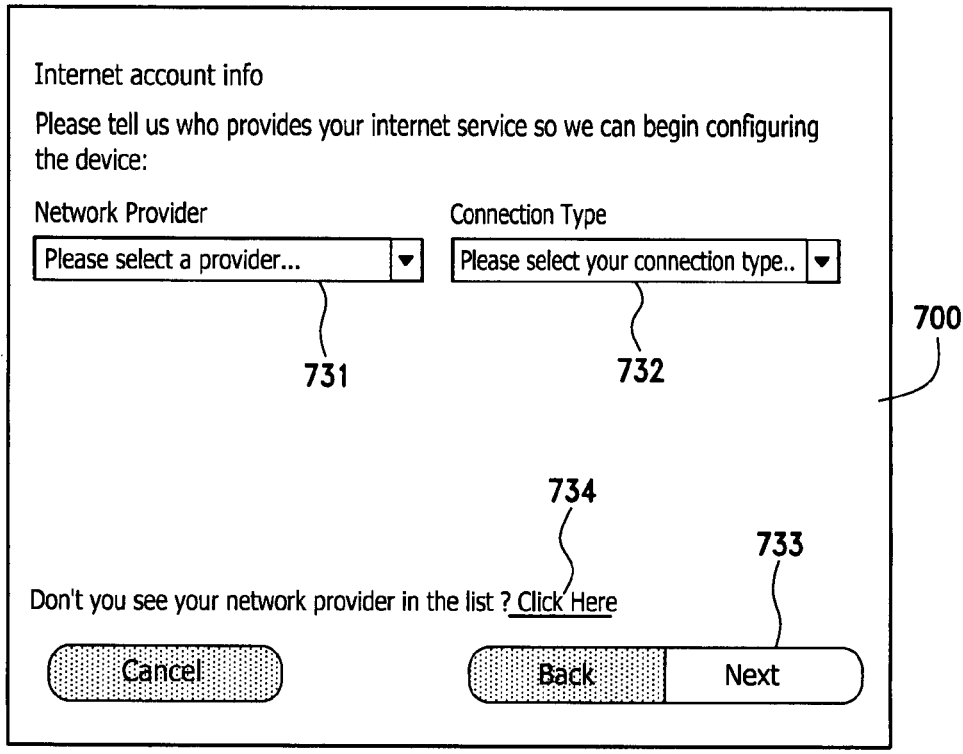
FIG. 7 illustrates an example of a web page used to collect information about a network provider of FIG. 1, according to an embodiment.
FIG. 8 illustrates an example of a chart of information used to configure a network connection, according to an embodiment.

FIG. 7 illustrates an example of a web page 700 that is used to collect information about network provider 104 (FIG. 1), according to an embodiment. On web page 700, in this embodiment, the user is instructed to select the name of the network provider from a combo box 731.

After the network provider is selected, computer communications component 111 provides the name of the network provider to configuration component 121. Configuration component 121 then determines, in this embodiment, if there is more than one possible network connection type for the selected network provider. If more than one possible network connection type exists, configuration component 121 communicates the possible network connection types to computer communications component 111 in this embodiment. Computer communications component 111 then instructs internet browser 142 to display combo box 732 in web page 700 in this embodiment. The user can then select the network connection type from a combo box 732.

In some embodiments, the network connection type label and combo box 732 are hidden until the network provider has been selected. In this embodiment, the network connection type label and combo box 732 are only displayed if the network provider has more than one network connection type. After the user has entered the name of network provider 104 and, if necessary, the network connection type, the user clicks a button 733. If the network provider for the user is not shown in combo box 731, the user can click a button 734.

Referring back to FIG. 6, the next activity in procedure 576 is an activity 682 determining if network provider 104 (FIG. 1) is in the network provider database. In one example, if the user selects a network provider and, if necessary, the network connection types, information regarding the network provider is in the network provider database. If the user clicks button 734 (FIG. 7), configuration component 121 concludes that the network provider is not in the network provider database.

If the network provider 104 is not in the network provider database, the next activity in procedure 576 is an activity 683 of obtaining information regarding network provider 104 (FIG. 1). In one embodiment, computer communications component 111 (FIG. 1) instructs computer 102 to display a series of web pages in internet browser 142 to collect the information. In one embodiment where electrical device 101 is a modem-router or a modem, the specific information is shown in the table in FIG. 8. FIG. 8 illustrates an example of a chart 800 of information used to configure a network connection, according to an embodiment. Beside the information listed in chart 800, other user-specific information could be used to configure the network connection. The user can also be asked to provide this user-specific information. For example, for PPPoE or PPPoA network connections, a user can be asked to provide the user's username and password.

FIG. 9 illustrates an example of a web page 900 used to collect information about electrical device 101 (FIG. 1), according to an embodiment. In one example, if electrical device 101 (FIG. 1) is a modem-router or a modem, web page 900 is displayed to the user in internet browser 142 (FIG. 1) and the user can enter the VCI, VPI, and encapsulation information for electrical device 101 (FIG. 1). After entering the information, the user can click a button 933 to submit the information. In one example, after receiving the information entered in web page 900, computer communications component 111 (FIG. 1) instructs computer 102 (FIG. 1) to display a web page 1000 (FIG. 10) in internet browser 142 (FIG. 1).

FIG. 10 illustrates an example of web page 1000 used to collect information about the network connection type used by a network provider 104 (FIG. 1), according to an embodiment. In web page 1000, the user enters the network connection type information. Depending on the network connection type, one or more additional web pages can be presented to the user and the user can enter the needed information for that network connection type. FIG. 11 illustrates an example of a web page 1100 used to collect information for a static network connection type, according to an embodiment. FIG. 12 illustrates an example of a web page 1200 used to collect information for a PPPoE or a PPPoA network connection type, according to an embodiment. FIG. 13 illustrates an example of a web page 1300 used to collect information for a PPTP network connection type, according to an embodiment. In this embodiment, computer communications component 111 (FIG. 1) instructs computer 102 (FIG. 1) to display one of web pages 1100 (FIG. 11), 1200 (FIG. 12), or 1300 (FIG. 13) depending on the network connection type entered in web page 1000 (FIG. 10).

In a different example, if electrical device 101 is a router and the network provider 104 is not in the network provider database, web page 1000 (FIG. 10) is displayed to the user and the user can select the network connection type. After selecting the network connection type, computer communications component 111 (FIG. 1) instructs computer 102 (FIG. 1) to display one of web pages 1100 (FIG. 11), 1200 (FIG. 12), or 1300 (FIG. 13) depending on the network connection type entered into web page 1000 (FIG. 10). In some examples, after obtaining the information regarding network provider 104 (FIG. 1), the next activity in procedure 576 is an activity 686 of obtaining user specific information. In other examples, after obtaining the information regarding network provider 104 (FIG. 1), the next step is activity 687 instead of activity 686 of establishing a network connection.

Referring again to FIG. 6, if system 100 determines the network provider is in the network provider database (activity 682), the next activity in procedure 576 is an activity 684 of determining whether all of the needed information is available in the network provider database. In one embodiment, computer communications component 111 (FIG. 1) communicates the information entered into web page 700 (FIG. 7) to configuration component 121 (FIG. 1). Configuration component 121 (FIG. 1) can then determine if all of the needed information for the selected network provider and network connection type exists in the network provider database. In one embodiment where electrical device 101 (FIG. 1) is a modem-router or a modem, the needed information is shown in the table in FIG. 8.

If not all of the needed information is available in network provider database, the next activity in procedure 576 is an activity 685 of obtaining the missing information. In one example, configuration component 121 (FIG. 1) determines what information is missing and communicates the list of missing information to computer communications component 111 (FIG. 1). Computer communications component 111 (FIG. 1) instructs computer 102 (FIG. 1) to display one or more of web pages 900 (FIG. 9), 1000 (FIG. 10), 1100 (FIG. 11), 1200 (FIG. 12) and 1300 (FIG. 13), depending on what information is needed.

If the network provider database includes all of the needed information regarding network provider 104 (FIG. 1) in activity 684, the next activity in procedure 576 is activity 686 of obtaining user-specific information. In one embodiment, in activity 686, if the network connection type is PPPoE, PPPoA, or PPTP, the user is asked to enter a username and password to log into the user account with network provider 104 (FIG. 1). In one example, computer communications component 111 (FIG. 1) instructs computer 102 (FIG. 1) to display a web page that allows a user to provide the user-specific information. FIG. 14 illustrates an example of a web page 1400 used to collect the user information, according to an embodiment.

If the network connection type is static, computer communications component 111 (FIG. 1) instructs computer 102 (FIG. 1) to display web page 1100 (FIG. 11) where the user can enter the information about the network connection if the user has not already entered this information. If the network connection type does not require any user-specific information from the user, activity 686 can be skipped.

Referring again to FIG. 6, if all of the user-specific information was obtained, the next activity in procedure 576 is an activity 687 of attempting to establish a network connection. The method used to establish a network connection depends on the type of network connection. For example, if the network connection type is PPPoE, the method outlined in procedure 573 (FIG. 5) can be used to establish a network connection. The methods used to establish PPPoA, PPTP, and static network connections are well-known in the art and will not be described or depicted further herein.

After attempting to establish a network connection, the next activity in procedure 576 is an activity 688 of determining whether a network connection was established. For example, if the network connection type is PPPoE, the method outlined in procedure 574 of FIG. 5 can be used to determine whether a network connection was established. In other examples, if IP parameters have been assigned to electrical device 101 (FIG. 1) or computer 102 (FIG. 1), the network connection has been established If the network connection is not established, the next activity in procedure 576 is an activity 689 of manually configuring the network connection. In some examples, manually configuring the network connection involves contacting network provider 104 (FIG. 1) to obtain the network setting or technical assistance in configuring electrical device 101 (FIG. 1).

If system 100 determines that the network connection is established, procedure 576 of FIG. 5 is complete and process 462 of FIG. 4 is also complete. Referring again to FIG. 4, the next process in activity 255 is a process 463 of testing the network connection.

Referencing FIG. 1, in one example, network provider detection component 113 tests the network connection by pinging a target host in non-local network 105. Ping is a computer network tool used to test whether a particular host is reachable across an IP network. Ping works by sending Internet Control Message Protocol (ICMP) echo request packets to a target host and listening for ICMP echo response replies. If ICMP echo response replies are received, network provider detection component 113 concludes a network connection exists between electrical device 101 and non-local network 105.

Figure 15:
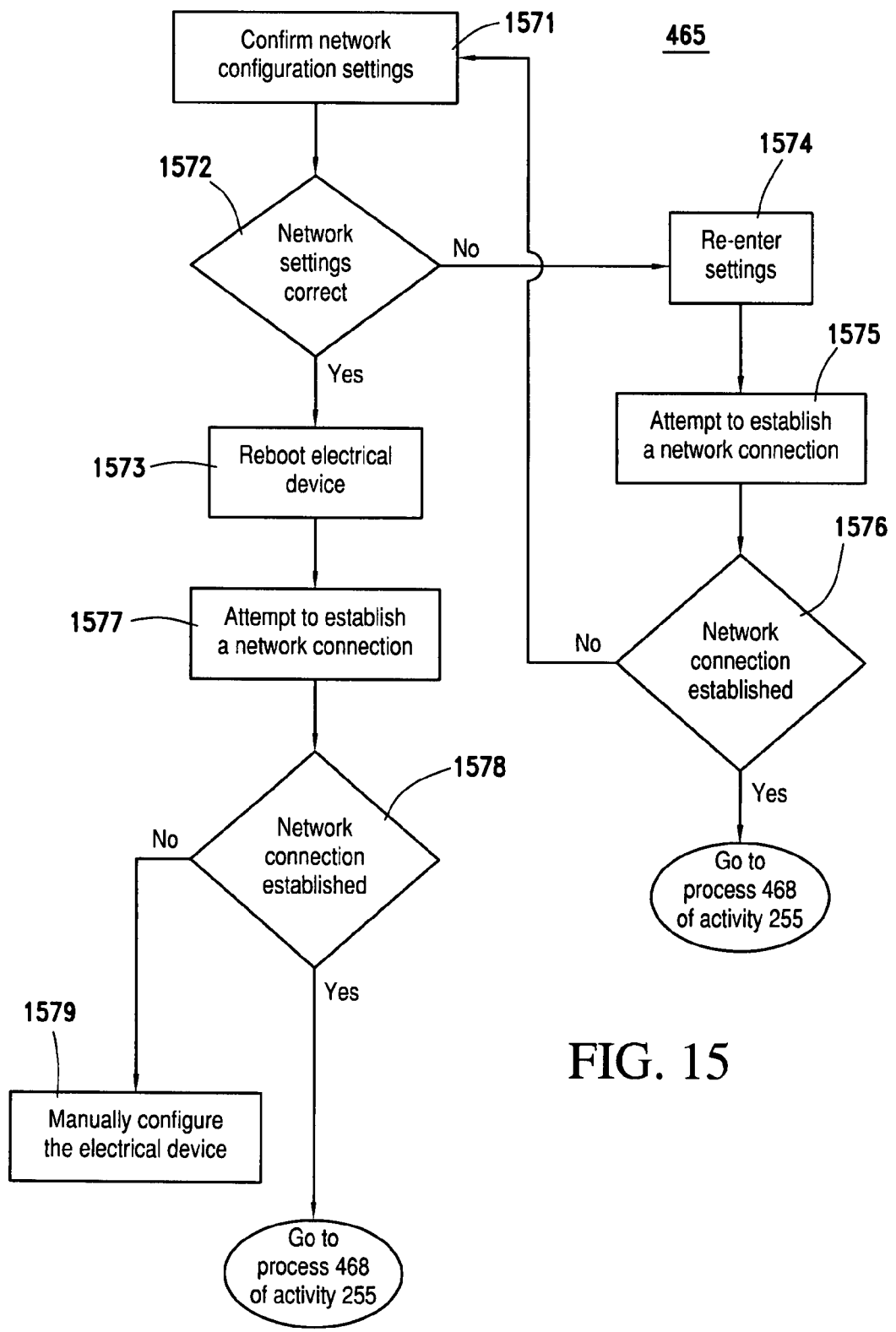
FIG. 15 illustrates a flow chart describing an example of a process of fixing a network connection, according to the first embodiment.

If a network connection exists, the next process of FIG. 4 is process 464 of configuring the security and the local network. If a network connection is not detected, the next process of FIG. 4 is a process 465 of fixing the network connection. FIG. 15 illustrates a flow chart describing an example of process 465 of fixing the network connection, according to the first embodiment.

Referring to FIG. 15, the first procedure in process 465 is a procedure 1571 of confirming the network connection configuration information. In one embodiment, computer communications component 111 (FIG. 1) instructs computer 102 (FIG. 1) to display a web page in internet browser 142 (FIG. 1) where the user can confirm the network connection configuration information. FIG. 16 illustrates an example of a web page 1600 used to confirm the network connection configuration information for a static network connection type, according to an embodiment. FIG. 17 illustrates an example of a web page 1700 used to confirm the network connection configuration information for a PPPoE or PPPoA network connection type, according to an embodiment. FIG. 18 illustrates an example of a web page 1800 used to confirm the network connection configuration information for a PPTP network connection type, according to an embodiment.

Referring again to FIG. 15, the next procedure in process 465 is a procedure 1572 of determining whether network connection configuration information is correct. If the user indicates the network connection configuration information is correct in web page 1600 (FIG. 16), 1700 (FIG. 17), or 1800 (FIG. 18), the next procedure in process 465 is a procedure 1573 of rebooting electrical device 101 (FIG. 7).

If the network connection configuration information is not correct, the next procedure in process 465 is a procedure 1574 of re-entering the network connection configuration information. In procedure 1574, the user is prompted to enter the network connection configuration information. In one example, procedure 1574 is similar to activity 683 of FIG. 6. After the user has re-entered the network connection configuration information, process 465 is complete and the next process in activity 255 (FIG. 2) is a process 468 (FIG. 4) of testing the network connection.

After the user re-enter the network connection configuration information, the next procedure in process 465 is a procedure 1575 of attempting to establish a network connection. In one example, procedure 1575 can be similar to activity 687 of FIG. 6.

After attempting to establish a network connection, the next procedure in process 465 is a procedure 1576 of determining whether a network connection was established. In one example, procedure 1576 can be similar to activity 688 of FIG. 6. If the network connection is established, process 465 is complete and the next process in activity 255 is process 468 of determining if the network connection is fixed.

If the network connection is not established in procedure 1576, the next procedure in process 465 is procedure 1571 of confirming the network configuration settings. If the user confirms the network connection configuration information for electrical device 101 (FIG. 1) in procedure 1572, the next procedure in process 465 is procedure 1573 of rebooting electrical device 101 (FIG. 1). Referring back to FIG. 1, reboot component 122 is configured to reboot electrical device 101 or the portion of electrical device 101 when electrical device 101 cannot connect to network provider 104 in one example. Rebooting electrical device 101 can refer to cycling the power of electrical device 101 (FIG. 1). In other embodiments, rebooting can include other procedures or activities.

In a different example, when electrical device is a modem-router, reboot component 122 can reboot the modem portion of electrical device 101. In other examples, reboot component 122 can reboot the modem portion and the router portion of electrical device 101.

Referring back to FIG. 4, after electrical device 101 (FIG. 1) or a portion of electrical device 101 has been rebooted, the next procedure in process 465 is a procedure 1577 of attempting to establish a network connection. In one example, procedure 1577 can be identical to or substantially similar to procedure 1575.

After attempting to establish a network connection in procedure 1577, the next procedure in process 465 is a procedure 1578 of determining whether a network connection exists. In one example, procedure 1578 can be identical to or substantially similar to procedure 1576.

If the network connection is not established in procedure 1578, the next procedure in process 465 is a procedure 1579 of manually configuring the network connection. In some examples, manually configuring the network connection involves contacting network provider 104 (FIG. 1) to obtain the network setting or technical assistance in configuring electrical device 101 (FIG. 1).

If a network connection has been established, process 465 is complete and the next process in activity 255 is process 468 of testing whether the network connection is fixed. In one embodiment, process 468 involves testing whether a network connection has been fixed. In one example, process 468 can be similar to process 463 of testing the network connection.

If a network connection does not exist, the next process in activity 255 is a process 467 of manually configuring the network connection. In some examples, manually configuring the network connection involves contacting network provider 104 to obtain the network setting or technical assistance in configuring electrical device 101.

If the network connection exists, the next process in activity 255 is process 464 of configuring network security and the local network. In one embodiment, process 464 can include the user entering the local network name and password, the service set identifier (SSID) for a wireless network, a network guest SSID and key, etc.

Referring back to FIG. 1, in some embodiments where electrical device 101 includes a user communications interface 135, the user can configure the local security using user communications interface 135. In another embodiment, user communications interface 135 can be used to confirm that the user wants to use the default network security and local network settings. In this embodiment, if the user wants to use non-default settings, the user is prompted by user communications interface 135 to enter the setting into user communications interface 141. In yet another embodiment, the network security and local network is configured using user communications interface 141 and not user communications interface 135.

In some embodiments, initially configuring electrical device 101 (activity 255 in FIG. 2) can include installing electrical device component 143 in computer 102. For example, if electrical device 101 requires drivers to be installed in computer 102, activity 255 (FIG. 2) can include installing these drivers.

After configuring network security and the local network in process 464, activity 255 is complete. Referring back to FIG. 2, the next activity in method 200 is activity 256 of using electrical device 101 (FIG. 1). In one embodiment, using electrical device 101 (FIG. 1) includes accessing non-local network 105 (FIG. 1) from computer 102 (FIG. 1) through electrical device 101 (FIG. 1). In one example, the non-local network accessed is the internet. In other examples, using electrical device 101 (FIG. 1) involves storing data in electrical device 101 (FIG. 1), printing documents using electrical device 101 (FIG. 1), or taking pictures or video using electrical device 101 (FIG. 1).

Figure 19:
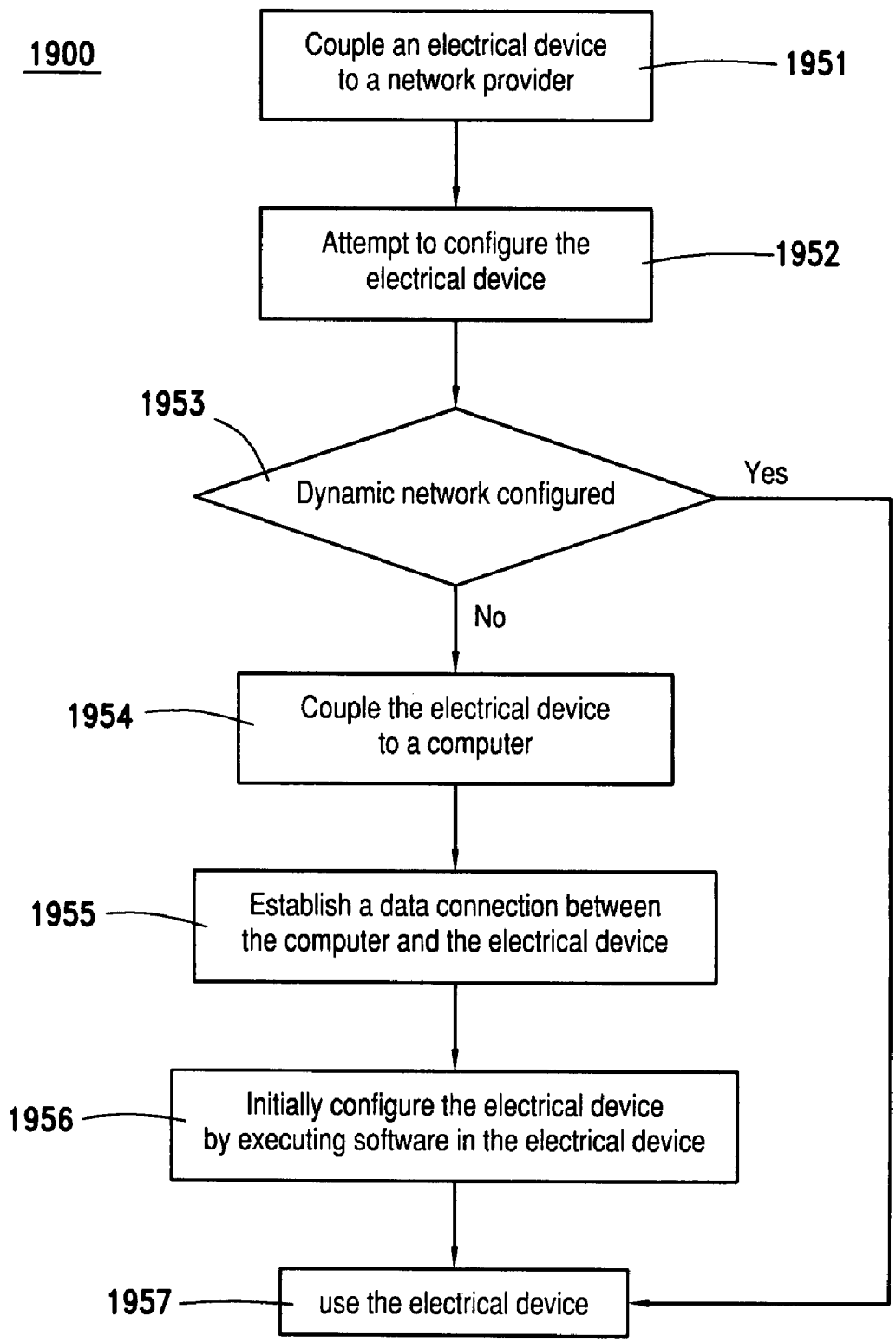
FIG. 19 illustrates a flow chart for an example of a method of configuring the electrical device of FIG. 1, according to a second embodiment.

In alternative embodiments, the initial configuration of electrical device 101 can begin before electrical device 101 is coupled to computer 102. FIG. 19 illustrates a flow chart for an example of a method 1900 of configuring electrical device 101 (FIG. 1), according to a second embodiment. In one example, system 100 (FIG. 1) is configured to perform method 1900. In the illustrated example of method 1900, it is assumed that electrical device 101 (FIG. 1) is not configured.

In one embodiment, the first activity in method 1900 is an activity 1951 of coupling electrical device 101 (FIG. 1) to network provider 104 (FIG. 1). In one example, activity 1951 can be similar to activity 252 of FIG. 2.

The next activity in method 1900 is an activity 1952 of attempting to configure electrical device 101 (FIG. 1). In this embodiment, electrical device 101 (FIG. 1) can be configured in some cases without coupling electrical device 101 (FIG. 1) to computer 102 (FIG. 1).

Figure 20:
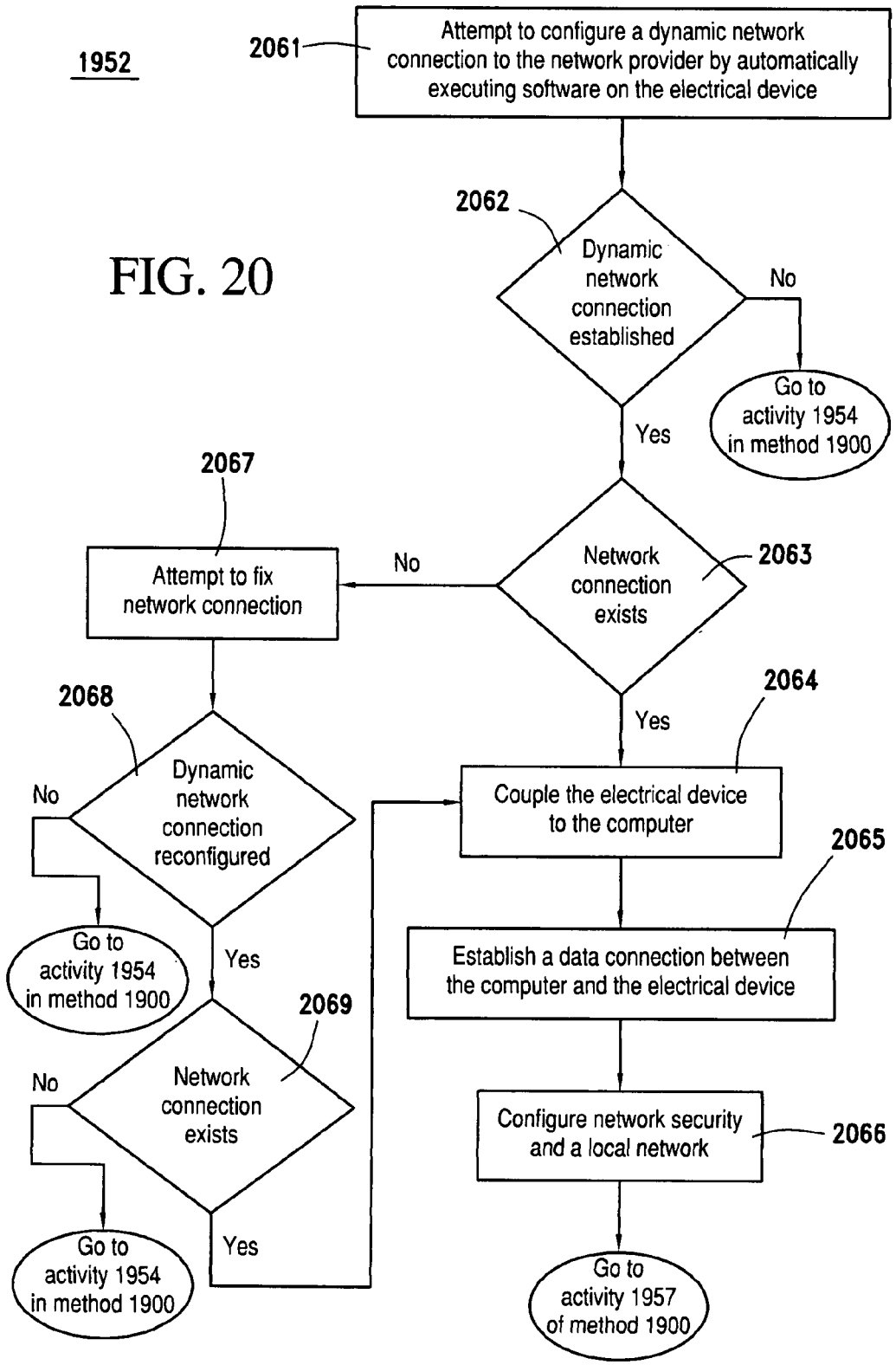
FIG. 20 illustrates a flow chart for an example of a method of attempting to initially configure a dynamic network connection of FIG. 19, according to the second embodiment.

FIG. 20 illustrates a flow chart describing an example of activity 1952, according to the first embodiment. The first process in activity 1952 is a process 2061 of attempting to configure a dynamic network connection to network provider 104 (FIG. 1) by automatically executing software in electrical device 101. In one example, process 2061 can be identical to or substantially similar to procedure 571 of FIG. 5.

Referring again to FIG. 20, the next procedure in activity 1952 is a process 2062 of determining whether a dynamic network connection was established. In one example, process 2062 can be identical to or substantially similar to procedure 572 of FIG. 5. If the dynamic network was not established, activity 1952 is complete and the next activity in method 1900 (FIG. 19) is an activity 1954 (FIG. 19) of coupling electrical device 101 (FIG. 1) to computer 102 (FIG. 1).

If the dynamic network was established, the next process in activity 1952 is a process 2063 of testing the network connection. In one example, process 2063 can be identical to or substantially similar to process 463 of FIG. 4.

If the network connection is not configured in process 2063, the next process in activity 1952 is a process 2067 of attempting to fix the network connection. In one embodiment, network provider detection component 113 (FIG. 1) can attempt to re-initialize the dynamic network connection. In one example, network provider detection component 113 (FIG. 1) can attempt to re-initialize the dynamic network connection by sending out a query requesting a new assignment of IP parameters from network provider 104 and then attempting to reconfigure the network connection. In some embodiments, reboot component 122 (FIG. 1) can reboot at least a portion of electrical device 101 (FIG. 1) and/or electrical device 303 (FIG. 3) before or after attempting to re-initialize the dynamic network connection.

After attempting to fix the network connection, the next procedure in activity 1952 is a process 2068 of determining whether the dynamic network connection was reconfigured. In one example, process 2068 can be identical to or substantially similar process 2062 and/or procedure 572 of FIG. 5. If the dynamic network connection was not reconfigured, activity 1952 is complete and the next activity in method 1900 (FIG. 19) is activity 1954 (FIG. 19).

If the dynamic network was reconfigured, the next procedure in activity 1952 is a process 2069 of testing the network connection. In one example, process 2069 can be identical to or substantially similar to process 2063 and/or process 463 of FIG. 4. If the network connection does not exist, activity 1952 is complete and the next activity in method 1900 (FIG. 19) is activity 1954 (FIG. 19).

If the network connection exists in either process 2063 or 2069, the next process in activity 1952 is a process 2064 of coupling electrical device 101 (FIG. 1) to computer 102 (FIG. 1). In one example, process 2064 can be identical to or substantially similar to activity 251 of FIG. 2.

After coupling electrical device 101 (FIG. 1) to computer 102 (FIG. 1), the next process in activity 1952 is a process 2065 of establishing a data connection between computer 102 (FIG. 1) and electrical device 101 (FIG. 1). In one example, process 2065 can be identical to or substantially similar to activity 253 of FIG. 2.

Subsequently, activity 1952 includes a process 2066 of configuring network security and the local network. In one example, process 2066 can be identical to or substantially similar to process 464 of FIG. 4. After configuring the network security and local network, activity 1952 is complete and the next activity in method 1900 (FIG. 19) is an activity 1957 (FIG. 19) of using electrical device 101 (FIG. 1). In one example, activity 1957 (FIG. 19) can be identical to or substantially similar to activity 256 of FIG. 2.

Referring back to FIG. 9, the next activity in method 1900 is an activity 1953 of determining whether the dynamic network is configured. A dynamic network was configured if the network passed the network connection test in process 2063 (FIG. 20). If the dynamic network was configured, the next activity in method 1900 is an activity 1957 of using the electrical device.

If a dynamic network connection is not configured, a subsequent activity in method 1900 is activity 1954 of coupling electrical device 101 (FIG. 1) to computer 102 (FIG. 1). In one example, activity 1952 can be identical to or substantially similar to activity 251 of FIG. 2 and/or process 2064 of FIG. 20.

After coupling electrical device 101 (FIG. 1) to computer 102 (FIG. 1), the next activity in method 1900 is an activity 1955 of establishing a data connection between computer 102 (FIG. 1) and electrical device 101 (FIG. 1). In one example, activity 1955 can be identical to or substantially similar to activity 253 of FIG. 2 and/or process 2065 of FIG. 20.

The next activity in method 1900 is an activity 1956 of initially configuring electrical device 101 (FIG. 1) by automatically executing the software in electrical device 101 (FIG. 1). In one example, activity 1956 is identical to or substantially similar to activity 255 of FIGS. 2 and 4. In another example, activity 1956 is similar to activity 255 of FIGS. 2 and 4 but does not include procedures 571 and 572 of FIG. 5.

In some embodiments, activity 1956 can be performed before performing activities 1954 and 1955. In these embodiments, the user can enter the installation information used during the initial configuration through user communications interface 135 (FIG. 1).

After either the dynamic or non-dynamic network connection has been configured, the last activity in method 1900 is activity 1957 of using electrical device 101 (FIG. 1). In one example, activity 1957 can be identical to or substantially similar to activity 256 of FIG. 2.

Figure 21:
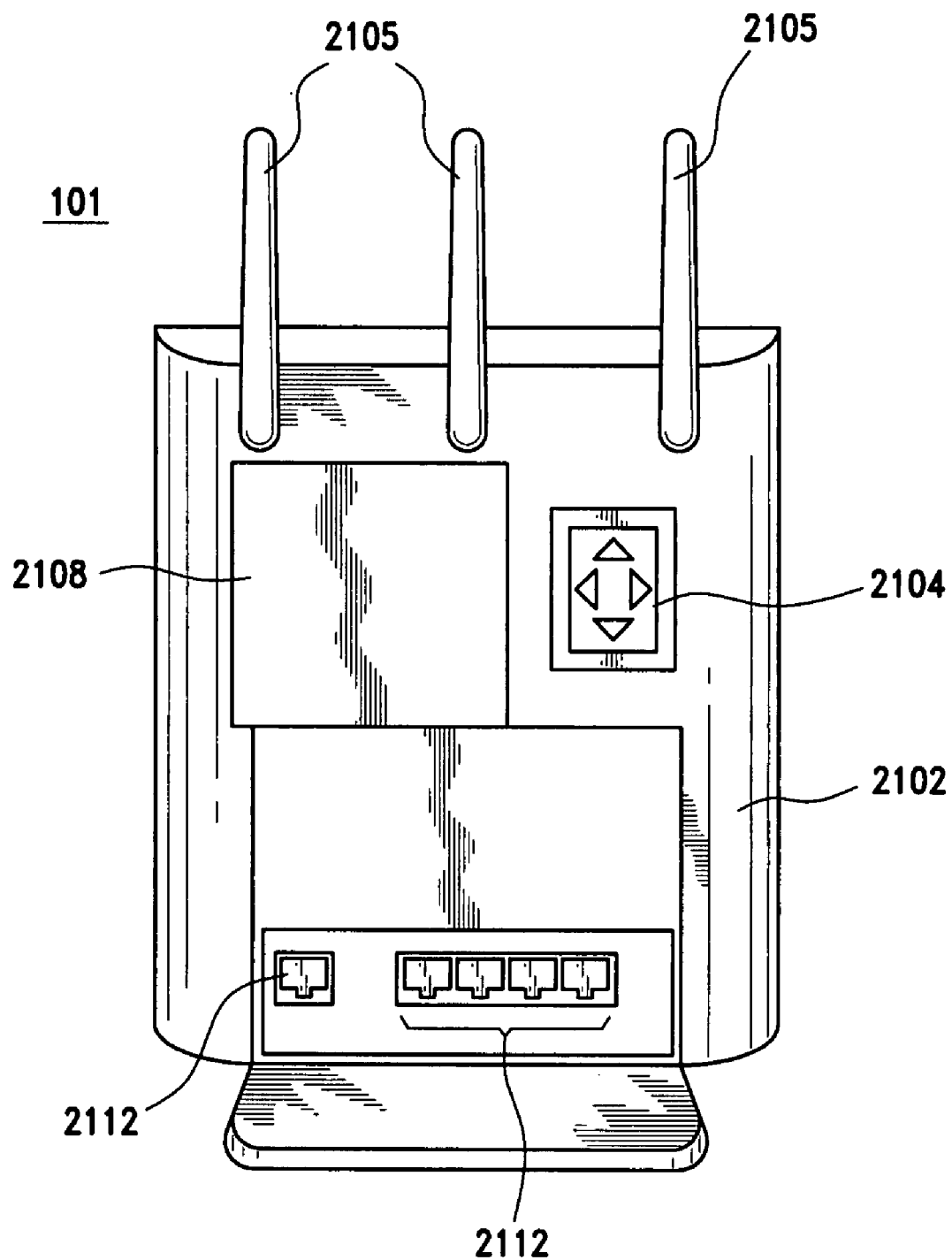
FIG. 21 illustrates an example of an electrical device that is suitable for implementing an embodiment of the system of FIG. 1.

FIG. 21 illustrates an example of electrical device 101 that is suitable for implementing an embodiment of system 100 (FIG. 1). Electrical device 101 includes a chassis 2102 containing one or more circuit boards (not shown), a video screen 2108, one or more network connectors 2112, an input device 2104, and one or more antennas 2105. Antennas 2105 can be used for information transfer using electromagnetic waves (i.e., a wireless network).

Figure 22:
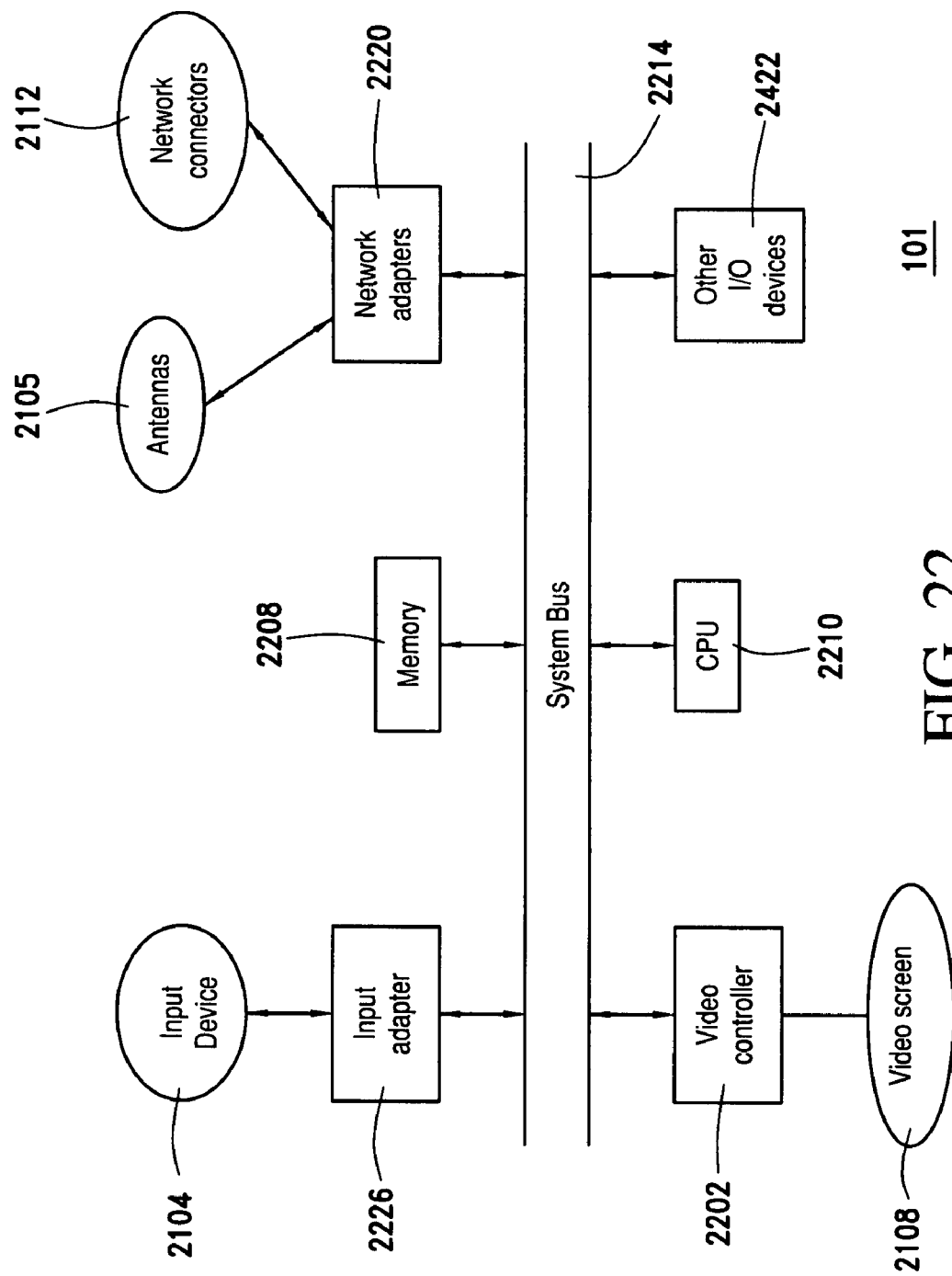
FIG. 22 illustrates a representative block diagram of an example of the elements included in the circuit boards inside the chassis of the electrical device of FIG. 21.

A representative block diagram of an example of the elements included in the circuit boards inside chassis 2102 is shown in FIG. 22. In this embodiment, a central processing unit (CPU) 2210 is coupled to a system bus 2214. In various embodiments, the architecture of CPU 2210 can be compliant with any of a variety of commercially distributed architecture families.

System bus 2214 also is coupled to memory 2208 that can include both read only memory (ROM) and random access memory (RAM). Non-volatile portions of memory 2208 or the ROM can be encoded with a boot code sequence suitable for restoring electrical device 101 (FIG. 1) to a functional state after a system reset.

In the depicted embodiment of FIG. 22, various I/O devices such as a video controller 2202, one or more network adapters 2220, an input adapter 2226, and other I/O devices 2422 can be coupled to a system bus 2414. In one example, network adapters 2220 are configured to be coupled to antennas 2105 and network connectors 2112. In one example, network connectors 2112 include one ADSL (Asymmetric Digital Subscriber Line) connector and four Ethernet ports. Network connectors 2112 and antennas 2105, though network adapters 2220 can be coupled to CPU 2210 directly or through system bus 2214. In other embodiments, distinct units can be used to control each of these devices separately.

Video controller 2202 can be suitable for refreshing video screen 2108 (FIG. 21). In some embodiments, video controller 2202 can include a graphics adapter. In some embodiments, input device 2104 is a keyboard and/or one or more buttons. In other examples, input device 2104 can be other types of input devices.

Although many other components of electrical device 101 (FIGS. 1 and 21) are not shown, such components and their interconnection are well known to those of ordinary skill in the art. Accordingly, further details concerning the construction and composition of electrical device 101 and the circuit boards inside electrical device 101 need not be discussed herein.

When electrical device 101 in FIGS. 1 and 21 is running, program instructions stored in memory 2208 (FIG. 22) are executed by CPU 2210 (FIG. 22). A portion of the program instructions, stored in these devices, can be suitable for carrying out the methods of configuring electrical device 101 with system 100 (FIG. 1) as described previously with respect to FIGS. 1-20.

Figure 23:
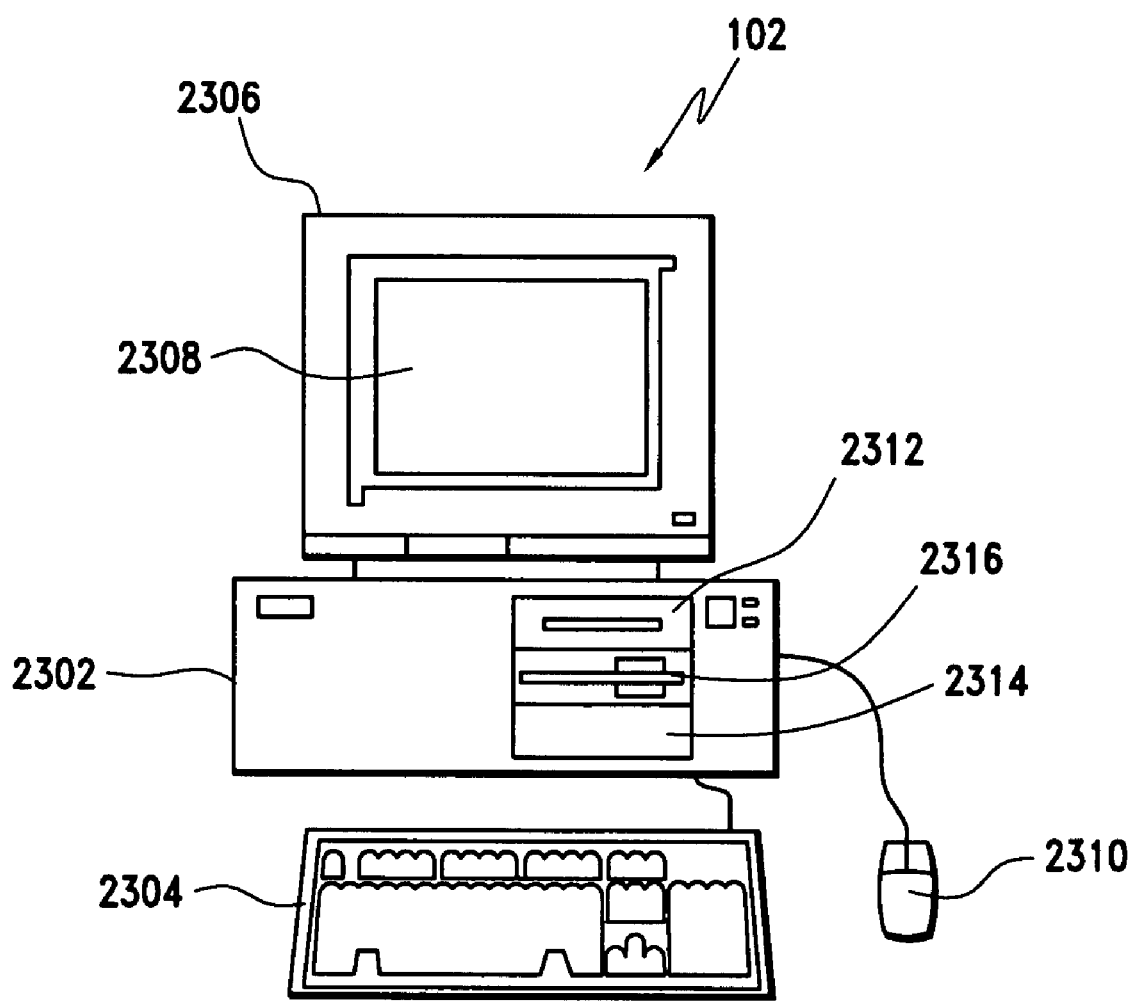
FIG. 23 illustrates an example of a computer that is suitable for working with an embodiment of the system of FIG. 1.
Figure 24:
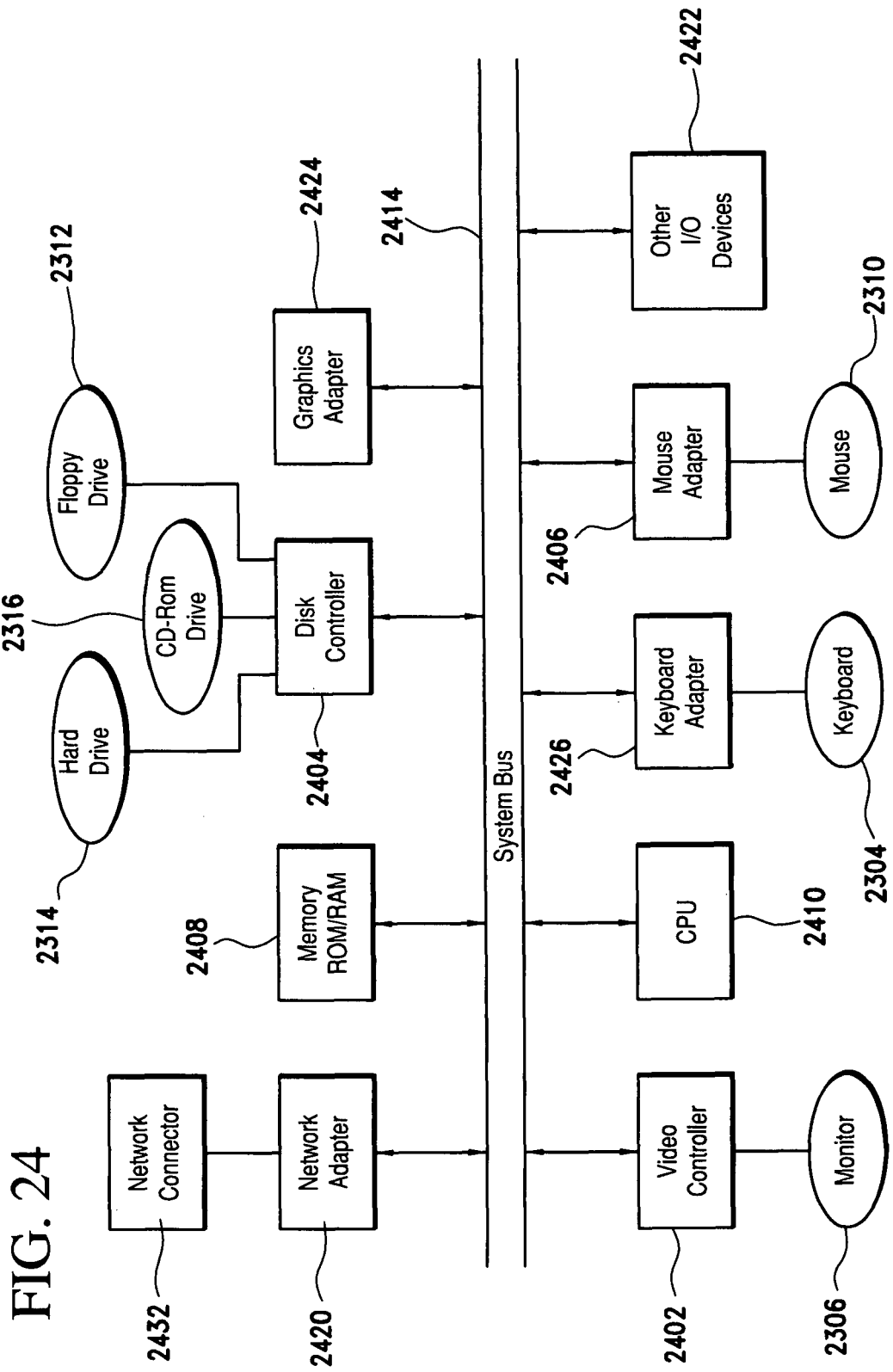
FIG. 24 illustrates a representative block diagram of an example of the elements included in the circuit boards inside the chassis of the computer of FIG. 23.

FIG. 23 illustrates an example of computer 102 that is suitable for working with system 100 (FIG. 1) in electrical device 101. Computer 102 includes a chassis 2302 containing one or more circuit boards (not shown), a floppy drive 2312, a Compact Disc Read-Only Memory (CD-ROM) drive 2316, and a hard drive 2314. A representative block diagram of an example of the elements included in the circuit boards inside chassis 2302 is shown in FIG. 24. A CPU 2410 in FIG. 24 is coupled to system bus 2414 in FIG. 24. In various embodiments, the architecture of CPU 2210 can be compliant with any of a variety of commercially distributed architecture families including the RS/6000 family, the Motorola 68000 family, or the Intel x86 family.

System bus 2414 also is coupled to memory 2408 that includes both read only memory (ROM) and random access memory (RAM). Non-volatile portions of memory 2408 or the ROM can be encoded with a boot code sequence suitable for restoring computer 102 (FIGS. 1 and 23) to a functional state after a system reset. In addition, memory 2408 can include microcode such as a Basic Input-Output System (BIOS).

In the depicted embodiment of FIG. 24, various I/O devices such as a disk controller 2404, a graphics adapter 2424, a video controller 2402, a keyboard adapter 2426, a mouse adapter 2406, a network adapter 2420, and other I/O devices 2422 can be coupled to system bus 2414. Keyboard adapter 2426 and mouse adapter 2406 are coupled to a keyboard 2304 (FIGS. 23 and 24) and a mouse 2310 (FIGS. 23 and 24), respectively, of computer 102 (FIGS. 1 and 23). While graphics adapter 2424 and video controller 2402 are indicated as distinct units in FIG. 24, video controller 2402 can be integrated into graphics adapter 2424, or vice versa in other embodiments. Video controller 2402 is suitable for refreshing a monitor 2306 (FIGS. 23 and 24) to display images in a screen 2308 (FIG. 23) of computer 102 (FIGS. 1 and 23). Disk controller 2404 can control hard drive 2314 (FIGS. 23 and 24), floppy drive 2312 (FIGS. 23 and 24), and CD-ROM drive 2316 (FIGS. 23 and 24). In other embodiments, distinct units can be used to control each of these devices separately. Network adapter can be coupled to one or more network connectors 2432.

Although many other components of computer 102 (FIGS. 1 and 23) are not shown, such components and their interconnection are well known to those of ordinary skill in the art. Accordingly, further details concerning the construction and composition of computer 102 (FIGS. 1 and 23) and the circuit boards inside chassis 2302 (FIG. 20) need not be discussed herein.

When computer 102 (FIGS. 1 and 23) is running, program instructions stored in a floppy disk in floppy drive 2312, in a CD-ROM in CD-ROM drive 2316, in hard drive 2314, or in memory 2408 (FIG. 21) are executed by CPU 2410 (FIG. 21). A portion of the program instructions, stored in these devices, can be suitable for carrying out the process related to system 100 (FIG. 1) as described previously with respect to FIGS. 1-22.

Although the invention has been described with reference to specific embodiments, it will be understood by those skilled in the art that various changes may be made without departing from the spirit or scope of the invention. For example, to one of ordinary skill in the art, it will be readily apparent process 462 of FIG. 4 of determining whether the user only wants to configure a non-local network can occur before process 461 (FIG. 4) of determining whether a dynamic network exits. In another example, instead of gathering input from a user using a web page, system 100 can have computer 102 (FIG. 1) display windows where the user can enter the needed information. In yet a further embodiment, the activities of testing the network connection can be omitted. In still another embodiment, electrical device 101 (FIG. 1) can be referred to as a network device. In another alternative embodiment, if the network connection is not established in activity 688 (FIG. 6), the next activity in procedure 576 (FIG. 6) could be a procedure identical to or substantially similar to process 465 of FIG. 4.

Additional examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims.

For example, to one of ordinary skill in the art, it will be readily apparent that the system discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system capable of configuring an electrical device coupled to a computer, the system comprising:
   a computer communications component of the electrical device configured to communicate with the computer; and
   an installation component of the electrical device configured to perform an initial configuration of a dynamic and a non-dynamic network connection between the electrical device and a network provider,
   wherein:
   the installation component of the electrical device is configured to automatically begin the initial configuration as soon as the installation component detects the electrical device is not configured and the computer communications component establishes a data connection between the electrical device and the computer; and
   the installation component is configured to attempt to initially configure the non-dynamic network connection if the installation component fails to initially configure the dynamic network connection between the electrical device and the network provider.

2. The system of claim 1, further comprising:
a network provider detection component configured to detect the dynamic or non-dynamic network connection between the electrical device and the network provider.

3. The system of claim 1, wherein:
the installation component comprises:
a status component capable of determining whether the electrical device has been initially configured.

4. The system of claim 1, wherein:
the installation component is configured to receive installation information from a user; and
the installation component uses the installation information received during the initial configuration.

5. The system of claim 4, wherein:
an internet browser is operating in the computer; and
the computer communications component is configured to receive the installation information from the user through the internet browser and communicating the installation information to the installation component.

6. The system of claim 1, further comprising:
a user communication interface of the electrical device,
wherein:
the user communication interface is configured to receive the installation information from the user and communicate the installation information to the installation component.

7. The system of claim 1, wherein:
the installation component comprises:
a reboot component configured to reboot all of the electrical device or a portion of the electrical device.

8. The system of claim 7, wherein:
the reboot component reboots the electrical device or the portion of the electrical device when electrical device cannot connect to the network provider.

9. The system of claim 1, wherein:
the electrical device is a modem.

10. The system of claim 1, wherein:
the electrical device is a router.

11. The system of claim 1, wherein:
the electrical device is a modem-router.

12. The system of claim 1, wherein:
the installation component is configured to perform the initial configuration by executing one or more program instructions stored in a memory of the electrical device.

13. A system for configuring a network connection from a computer to a network provider, the system comprising:
a status component in a network device capable of determining if the network device is configured to provide the network connection from the computer to the network provider; and
a configuration component in the network device capable of initially configuring the network device to provide the network connection from the computer to the network provider,
wherein:
the configuration component is configured to automatically begin initially configuring the network device to provide the network connection as soon as the status component determines the network device is not configured to provide the network connection from the computer to the network provider;
the configuration component is capable of initially configuring both a dynamic network connection and a non-dynamic network connection;
the configuration component is configured to attempt to initially configure the dynamic network connection and if the configuration component fails to initially configure the dynamic network connection between the electrical device and the network provider, the configuration component is configured to initially configure the non-dynamic network connection.

14. The system of claim 13, further comprising:
a connection component in the network device configured to facilitate communications between the network device and the computer and between the network device and the network provider,
wherein:
the configuration component is further configured to receive information from a user regarding initially configuring the network device via the connection component.

15. The system of claim 14, wherein:
an internet browser is operating in the computer; and
the connection component is configured to receive the information from the user through the internet browser in the computer.

16. A system in an electrical device for configuring a network connection from the electrical device to a network provider, the system comprising:
a status component capable of determining whether the electrical device has been initially configured; and
a configuration component in the electrical device capable of initially configuring the electrical device to provide the network connection from the electrical device to the network provider,
wherein:
the configuration component is configured to automatically initially configure the electrical device without the electrical device being coupled to the computer when the network connection is a dynamic network connection and the status component detects the electrical device is not configured; and
when the network connection is a non-dynamic network connection, the configuration component is configured to automatically begin initially configuring the electrical device as soon as the status component detects the electrical device is not configured.

17. The system of claim 16, further comprising:
a connection component in the electrical device configured to receive information from the network provider and communicating the information received from the network provider to the configuration component; and
the configuration component is further configured to use the information received from the network provider when initially configuring the electrical device.

18. The system of claim 16, further comprising:
a computer communications component configured to receive installation information from a user and communicating the installation information to the configuration component,
wherein:
the configuration component is further configured to use the installation information received from the user when initially configuring the electrical device.

19. The system of claim 18, wherein:
an internet browser is operating in the computer; and
the computer communications component is configured to receive the installation information from the user through the internet browser in the computer.

20. The system of claim 16, further comprising:
a user communication interface in the electrical device,
wherein:
- the user communication interface is configured to receive installation information from a user and communicating the installation information to the configuration component; and
- the configuration component is further capable of using the installation information received from the user when initially configuring the electrical device.

21. A method of configuring an electrical device comprising:
coupling the electrical device to a computer;
coupling the electrical device to a network provider;
establishing a data connection between the computer and the electrical device; and
after establishing the data connection, initially configuring the electrical device,
wherein:
the initially configuring the electrical device comprises:
automatically executing software in the electrical device capable of initially configuring both a dynamic network connection and a non-dynamic network connection between the electrical device and the network provider such that automatically executing the software comprises:
- attempting to initially configure the dynamic network connection between the electrical device and the network provider; and
- attempting to initially configure the non-dynamic network connection if the attempt to initially configure the dynamic network connection fails.

22. The method of claim 21, wherein:
initially configuring the electrical device further comprises:
attempting to detect a network connection between the electrical device and the network provider.

23. The method of claim 21, wherein:
coupling the electrical device to the network provider comprises:
coupling the electrical device to a modem; and
coupling the modem to the network provider.

24. The method of claim 21, wherein:
initially configuring the electrical device comprises:
receiving installation information from a user.

25. The method of claim 24, wherein:
receiving the installation information from the user comprises:
receiving the installation information from the user through the computer.

26. The method of claim 21, further comprising:
using the network device.

27. The method of claim 21, wherein:
the electrical device is a gateway device.

28. A method of configuring an network device comprising:
coupling the network device to a network provider;
attempting to initially configure a dynamic network connection between the network device and the network provider by automatically executing software in the network device if the network device is not configured; and
if the network device is not configured and the dynamic network connection was not configured, initially configuring a non-dynamic network by automatically executing the software in the network device, the initial configuring of the non-dynamic network comprises:
- beginning initial configuration of the non-dynamic network;
- receiving installation information from a user; and
- finishing the initial configuration of the non-dynamic network using the installation information received from the user.

29. The method of claim 28, further comprising:
after attempting to establish a dynamic network connection and before the initially configuring the non-dynamic network, coupling the network device to a computer; and
after the coupling the network device to the computer and before the initially configuring the non-dynamic network, establishing a data connection between the computer and the network device.

30. The method of claim 28, wherein:
receiving the installation information from the user comprises:
receiving the installation information from the user through a computer.

31. The method of claim 28, wherein:
receiving the installation information from the user comprises:
receiving the installation information from the user through a user communications interface in the network device.

32. The method of claim 28, wherein:
attempting to initially configure the dynamic network connection comprises:
sending a request to the network provider to assign an internet protocol address.

* * * * *